United States Patent [19]

Bennett

[11] Patent Number: 5,426,740
[45] Date of Patent: Jun. 20, 1995

[54] SIGNALING PROTOCOL FOR CONCURRENT BUS ACCESS IN A MULTIPROCESSOR SYSTEM

[75] Inventor: Brian R. Bennett, Laguna Niguel, Calif.

[73] Assignee: AST Research, Inc., Irvine, Calif.

[21] Appl. No.: 181,900

[22] Filed: Jan. 14, 1994

[51] Int. Cl.6 .............................. G06F 13/00
[52] U.S. Cl. .................... 395/325; 395/275; 395/725; 364/240; 364/229; 364/230.6; 364/DIG. 1
[58] Field of Search .................. 395/325, 275, 725

[56] References Cited

U.S. PATENT DOCUMENTS

| | | | |
|---|---|---|---|
| 3,959,775 | 5/1976 | Valassis et al. | 364/200 |
| 4,598,362 | 7/1986 | Kinjo et al. | 364/200 |
| 4,737,932 | 4/1988 | Baba | 364/900 |
| 4,837,682 | 6/1989 | Culler | 364/200 |
| 5,003,463 | 3/1991 | Coyle et al. | 364/200 |
| 5,065,313 | 11/1991 | Lunsford | 395/275 |
| 5,125,080 | 6/1992 | Fleva et al. | 395/325 |
| 5,170,481 | 12/1992 | Begun et al. | 395/725 |
| 5,220,651 | 6/1993 | Larson | 395/250 |
| 5,253,348 | 10/1993 | Scalise | 395/325 |
| 5,261,057 | 11/1993 | Coyle et al. | 395/275 |
| 5,263,139 | 11/1993 | Testa et al. | 395/325 |
| 5,280,589 | 1/1994 | Nakamura | 395/325 |
| 5,327,545 | 7/1994 | Begun et al. | 395/425 |
| 5,353,417 | 10/1994 | Fuoco et al. | 395/325 |

OTHER PUBLICATIONS

Description of Backoff Input from *Intel i486 Microprocessor Data Book*, Apr. 1989, p. 89.
Description of Backoff Sequence from *PCI Local Bus Specification*, Revision 2.0, Apr. 30, 1993, pp. 33-38.
*PCI Local Bus Specification*, Revision 2.0, Apr. 30, 1993, pp. 1-198.

*Primary Examiner*—Christopher B. Shin
*Attorney, Agent, or Firm*—Knobbe, Martens Olson & Bear

[57] ABSTRACT

An improved signaling protocol for use in a multiprocessor system enables concurrent access to a common system bus during an I/O bus access. This reduces the system bus idling time without introducing complexities into the system bus architecture which might otherwise reduce the overall bus bandwidth increase. The improved bus architecture uses a system generated I/O bus busy (IOBUS_BSY-) signal to indicate to all of the processors that the I/O bus is in use and that all other I/O requests must be held until the current transaction is completed. By preventing the other processors from executing an I/O request, the system bus does not have to be remain idle and can be used for memory-to-processor and for processor-to-processor transactions while the I/O bus is in use. By reducing the amount of time that the system bus is idle, the overall system bus performance is greatly increased.

3 Claims, 13 Drawing Sheets

SIGNALING PROTOCOL FOR CONCURRENT BUS ACCESS IN A MULTIPROCESSOR SYSTEM

BACKGROUND OF THE INVENTION

1. Field of the Invention

The present invention relates to an improved bus bridge which enables concurrent access to an I/O bus and a system bus in a multiprocessor system.

2. Description of the Related Art

In a multiprocessor system, all of the processors in the system share a common system bus and a common I/O bus. This common bus architecture restricts both the system bus and the I/O bus to a single transfer at a time. An I/O bus bridge links the system bus to the I/O bus. Therefore, when one processor is communicating with the system or I/O bus, the other processors are either busy with their own internal operations or are waiting for the system and I/O buses to become free. The time that the processor spends waiting for the buses to become available is referred to as bus latency.

In a conventional multiprocessor, common-bus architecture, during an I/O request, the system bus is actually needed only for a short time to transfer the requested address from the processor to the I/O bus bridge. However, the bus bridge holds the system bus idle for the entire data transfer. An I/O controller on the I/O bus latches the address from the I/O bus bridge and handles the request. The data transfer time may be quite long depending upon the access time of the I/O device. When the I/O cycle is complete, both the system bus and the I/O bus will become available to the other processors.

During the period that one processor is using the I/O bus, the bus bridge holds the system bus idle; and the other processor must wait for the buses to become available to initiate any type of data transfer. As the number of processors increases, the number of bus accesses increases, and, therefore, the bus latency increases. Inherent in typical bus architectures are periods of time when the I/O bus is being accessed and the system bus is being held idle while it awaits the completion of the I/O cycle. During this time, the requesting processor is not using the system bus. Rather, the requesting processor holds the system bus to prevent other processors from accessing the system bus until it receives a reply from the I/O bus indicating the completion of the I/O cycle. The time that the system bus is held but not active while waiting for the I/O cycle to be completed is a principal cause of bus latency in multiprocessor systems.

In order to cut down on the idling time of the system bus, a protocol needs to be developed to prevent any new I/O level transactions from occurring, while enabling system bus level transactions to occur. One possible solution would be to use a "back-off" operation to cancel any I/O requests that have started once a transaction on the I/O bus has begun, thereby releasing the system bus for memory and processor-to-processor transfers. The problem is that some I/O buses, such as EISA bus, do not allow for a graceful "back-off" operation. The only "back-off" operation provided by the EISA bus would result in the receipt of an error condition by the requesting processor which is not desirable.

If the I/O bus does not provide for a graceful back-off as in the case of the EISA bus, the only other solution would be to "back-off" the system bus. However, in a multiprocessor system it is only desirable to "back-off" the processor that is attempting to access the I/O bus and to allow the other processors on the system bus to proceed. Therefore having a single back-off signal would "back-off" the entire system bus. "Backing off" the entire bus would not solve the bus latency problem and would generate additional problems.

Another option would be to generate a "back-off" signal for each processor on the I/O bus bridge. In this case, N number of pins would have to be added to the bus bridge to send an individual back-off signal to each of N number of processors. A common number of processors in a multiprocessor system is 5-8 processors thus 5-8 pins would have to be added to the I/O bus bridge on average. A typical bus bridge is a pin limited circuit, i.e., there are not many extra pins available to add output signals. Additionally, logic would have to be added to the bus bridge for each back-off signal that needs to be controlled. These added complexities do not make it an optimal solution. Furthermore, if the I/O bus bridge allows data to be cached, the cache coherency protocol makes it very difficult to initiate a back-off protocol. Once a request is initiated, other processor modules may be snooping their caches and once snooped cannot be "unsnooped." Thus, the simple back-off protocol used in a single processor system is not an optimal solution for a multiprocessor system.

Another factor contributing to latency in a multiprocessor system is that most I/O buses are slower than system buses. For example, a common multiprocessor system bus runs at 25 MHz and is 64 bits wide. A common I/O bus, such as EISA bus, runs at 8 MHz and is only 32 bits wide. Therefore, a typical system bus can transfer data at a rate of 200 MBytes/sec. An EISA bus can only transfer data at 33 MBytes/sec. Therefore, the system bus is held for a long period of usable bus time while data is transferred from the I/O bus to the system by the slower data rate and lesser bit width of the I/O bus. The time period that the faster system bus is forced to wait for the slower bus to complete its transaction wastes the speed and efficiency that is available from the system bus and is a contributing factor to the system bus latency.

Therefore there exits a need in multiprocessor systems to decrease the bus latency caused by system bus idling during I/O bus transactions and lengthy I/O data transfers.

SUMMARY OF THE INVENTION

The preferred embodiment of the present invention comprises an improved signaling protocol for use in a multiprocessor system. Preferably, the multiprocessor system comprises a plurality of CPU modules connected to a common system bus and connected to an I/O bus via an I/O bus bridge. The design of the present invention makes use of the system bus idle time and enables concurrent access to a common system bus during an I/O bus access. Further, the present invention does not introduce complexities into the system bus architecture which reduce the overall bus bandwidth increase.

The improved bus architecture of the preferred embodiment uses a system generated I/O bus busy (IOBUS_BSY-) signal to indicate to all of the processors that the I/O bus is in use and all other I/O requests must be held until the current transaction is completed. By preventing the other processors from executing I/O requests, the system bus does not have to be held idle and can be used for processor-to-memory and for processor-to-processor transactions while the I/O bus is in use. By reducing the amount of time that the system bus must be held idle, the overall system bus performance is greatly increased.

In a preferred embodiment, an improved signaling protocol circuit for use in a multiprocessor system comprises an I/O bus protocol circuit, a bus controller logic circuit on each of the CPU modules, and an I/O bus inhibit circuit on each of the CPU modules. The I/O bus protocol circuit is preferably located on the I/O bus bridge and generates an I/O bus busy signal having first and second logic states. The first logic state of the I/O bus busy signal indicates that the I/O bus is currently busy processing an I/O bus transaction and the second logic state indicates that the I/O bus is available to process an I/O bus transaction. Each of the bus controller logic circuits on each of the CPU modules receives an address request from a respective CPU and controls the delivery of the CPU address request to the system bus. The I/O bus inhibit circuit on each of the CPU modules further comprises an address and cycle type decoder and a logic circuit. The address and cycle type decoder generates an I/O bus access signal having first and second logic states. The first logic state of the I/O bus access signal indicates that the CPU address request requires access to the I/O bus and the second logic state indicates that the CPU address request does not require access to the I/O bus. Preferably, the logic circuit has first and second inputs wherein a first input of the logic circuit is connected to the I/O bus access signal and the second input of the logic circuit is connected to the I/O bus busy signal. An output of the logic circuit generates an inhibit signal, wherein the inhibit signal is connected to the bus controller logic circuit to inhibit the delivery of the CPU address request to the system bus until the I/O bus has completed a current I/O transaction.

In a preferred embodiment, the improved signaling protocol circuit further comprises a buffer circuit interposed between the system bus and the I/O bus, wherein data transferred from the system bus to the I/O bus is transferred into the buffer circuit at a system bus rate and is transferred out of the buffer circuit at an I/O bus rate and data transferred from the I/O bus to the system bus is transferred into the buffer circuit at an I/O bus rate and is transferred out of the buffer circuit at a system bus rate.

The buffer circuit reduces the period of time for data transfers from the I/O bus to the system bus. The buffers circuit preferably located on the I/O bus bridge receives the data from the I/O bus at the slower rate of the I/O bus, and stores the data. While the data is being delivered from the I/O bus to the buffer circuit, the system bus is free to process other transactions and is not interrupted to receive data at the slower data rate of the I/O bus. Once all of the data is stored in the buffer circuit, the bus bridge notifies the system bus and bursts all of the data from the buffer circuit onto the system bus at the faster data rate of the system bus. This process greatly improves the efficiency of I/O bus to system bus data transfers.

A preferred embodiment of the improved signaling protocol method for use in a multiprocessor system comprises generating an I/O bus busy signal, having first and second logic states, on the I/O bus bridge, the first logic state indicating that the I/O bus is currently busy processing an I/O bus transaction and the second logic state indicating that the I/O bus is available to process an I/O bus transaction. Additionally, each of the CPU modules receives the I/O bus busy signal and determines if a CPU address request requires access to the I/O bus. The CPU address request is processed on the common system bus when the common system bus is available, if the CPU requested address does not require access to the I/O bus irrespective of the state of the I/O bus busy signal. The CPU address request is held if the address request requires access to the I/O bus and the I/O bus busy signal is at the first logic state. Finally, the CPU address request is processed when the system bus is available if the address request requires access to the I/O bus and the I/O bus busy signal is at the second logic state.

DETAILED DESCRIPTION OF THE PREFERRED EMBODIMENTS

Figure 1:
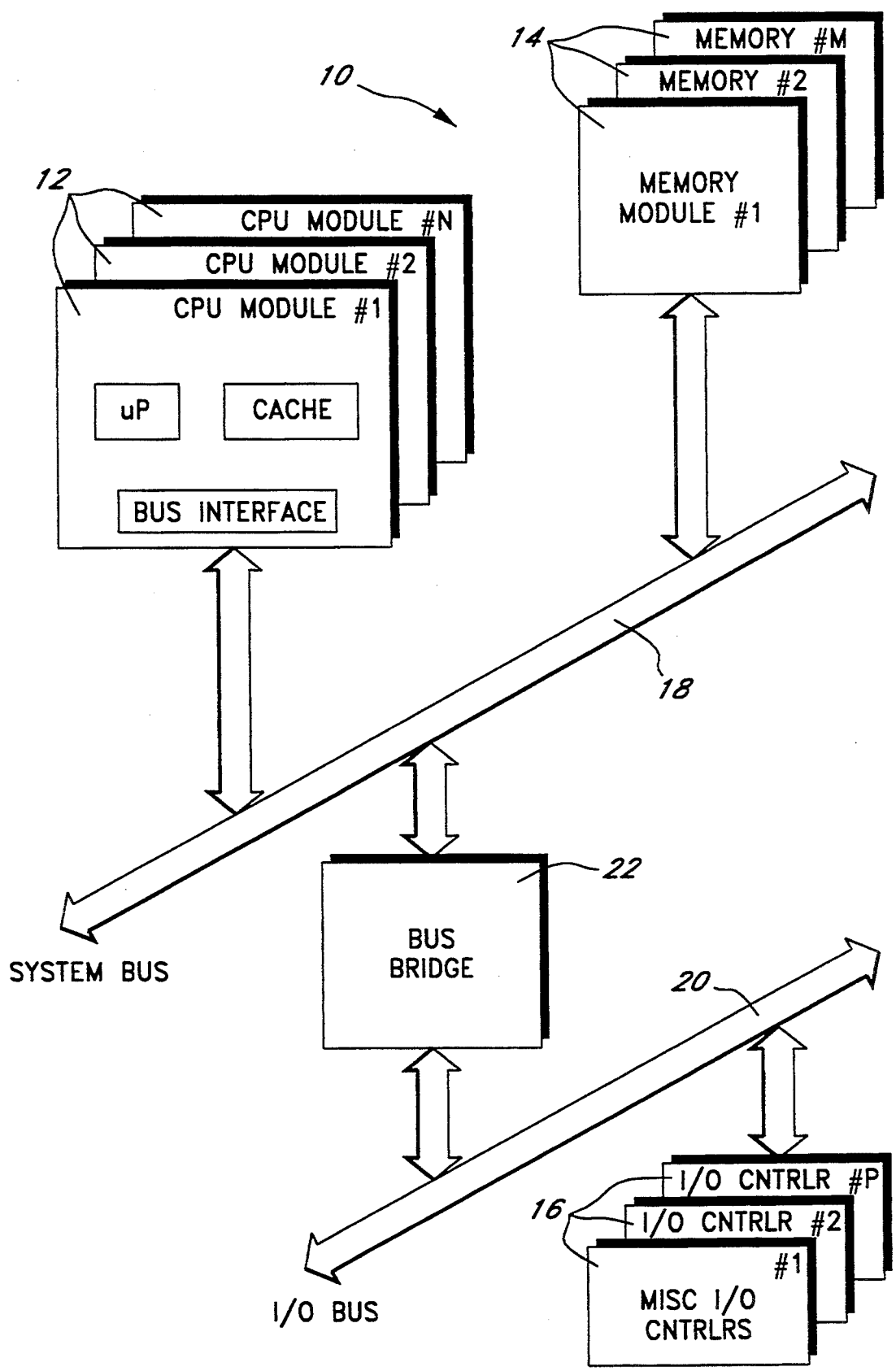
FIG. 1 is a system block diagram of a multiprocessor system which implements the bus architecture of a preferred embodiment of the present invention.

The preferred embodiment of the present invention comprises an improved signaling protocol for use in a multiprocessor system 10 with a common bus system (i.e., the processors have access to common memory and shared I/O resources). FIG. 1 illustrates a conventional multiprocessor system 10 which includes a number of CPU modules 12 (i.e., CPU module #1, CPU module #2, . . . . CPU module #N), a number of memory modules 14 (i.e., MEMORY module #1, MEMORY module #2 . . . . . MEMORY module #M) and a number of I/O CONTROLLERS 16 (i.e., I/O CONTROLLER #1, I/O CONTROLLER #2, . . . . I/O CONTROLLER #P). The CPU modules 12 and memory modules 14 are connected to a system bus 18 which further comprises a system address bus, a system data bus and a system control bus. The I/O controllers 16 are each connected to a peripheral I/O device (not shown) and control the operation of the device. All of the I/O controllers 16 are connected to an I/O bus 20. The I/O bus 20 further comprises an I/O address bus, an I/O data bus and an I/O control bus. A bus bridge 22 or an I/O service module (IOSM Module) provides an interface between the system bus 18 and the I/O bus 20 to control the data flow between the I/O controllers 16 and the system bus 18.

Figure 2:
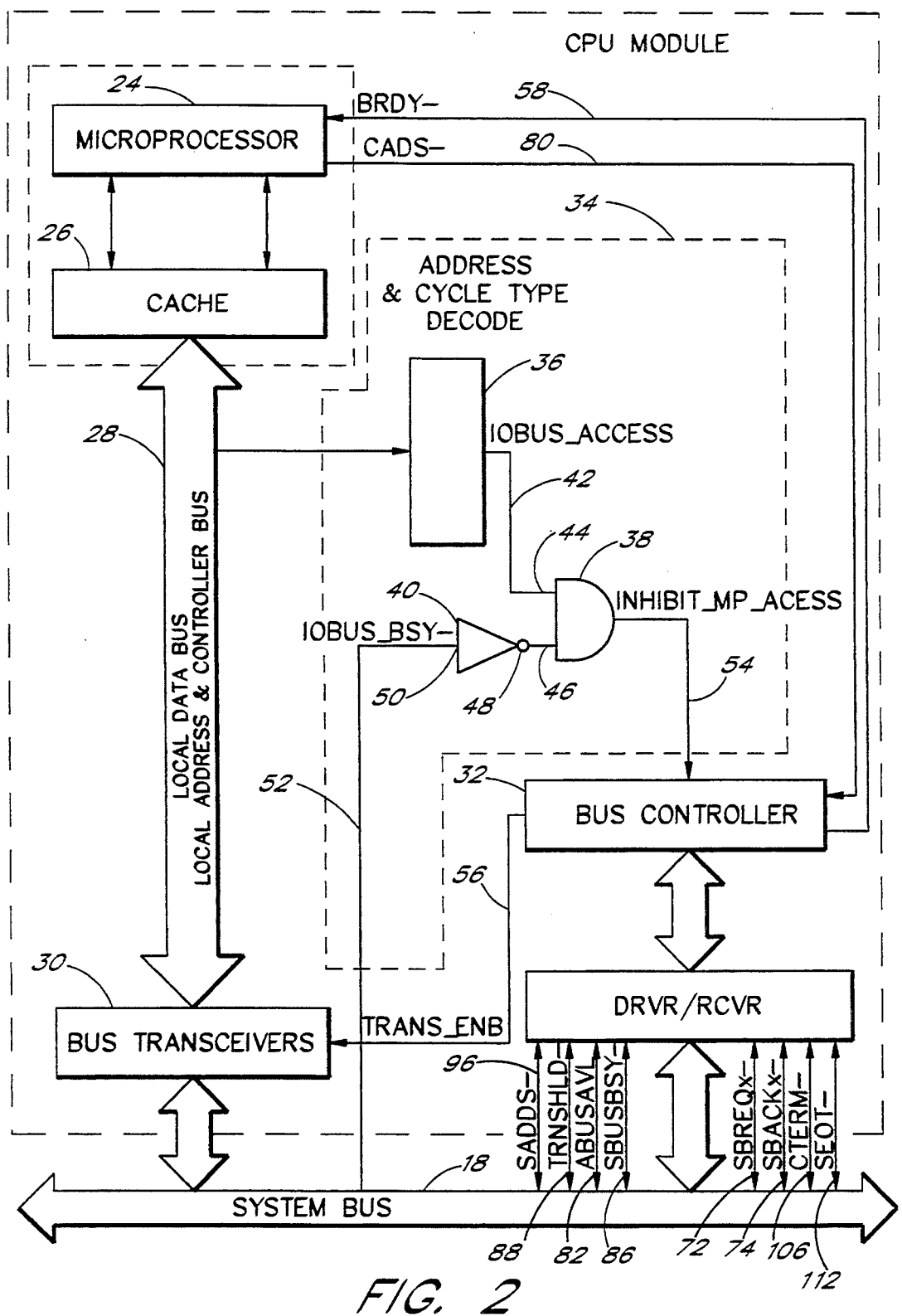
FIG. 2 is a block diagram of a typical CPU module used in the multiprocessor system and its communication with the system bus.

FIG. 2 illustrates a block diagram of a typical CPU module 12 used in the multiprocessor system 10 of FIG. 1. Preferably, the CPU module 12 comprises a microprocessor 24, a cache memory system (CACHE) 26 with internal decoder logic, a CPU or local processor bus 28, bus transceivers 30 and system bus controller logic 32. In accordance with one embodiment of the present invention, each CPU module 12 further includes an I/O bus inhibit circuit 34. One embodiment of the I/O bus inhibit circuit comprises an address and cycle type decoder 36, a two-input AND gate 38 and an inverter 40.

The address and cycle type decoder 36 is used to determine if the address requested by the microprocessor 24 requires access to the I/O bus 20. The output of the address and cycle type decoder 36 is an IOBUS_ACCESS signal on the line 42. The IOBUS_ACCESS signal is an active high signal, i.e., is at a logic high level when it is true and at a logic low level when false. The IOBUS_ACCESS signal on the line 42 is connected to a first input 44 of the two-input AND gate 38. A second input 46 of the two-input AND gate 38 is connected to an output 48 of the inverter 40. An input 50 of the inverter 40 is connected to an IOBUS_BSY- signal on a line 52. The IOBUS_BSY- signal on the line 52 is generated by the logic on an I/O bus protocol circuit, as described in more detail below, to indicate when the I/O bus 20 is currently in use. The IOBUS_BSY- signal is an active low signal, i.e., is at a logic low value when the signal is true and at a logic high value when the signal is false. The IOBUS_BSY- signal is therefore inverted by the inverter 40 to conform with the logic of the IOBUS_ACCESS signal on the line 42 which is an active high logic signal. The output of the two-input AND gate 38 generates an INHIBIT_MP_ACCESS signal on a line 54. The INHIBIT_MP_ACCESS signal is an active high signal and indicates to the bus controller 32 that the microprocessor 24 is requesting an address that requires access to the I/O bus 20 that is currently in use. The INHIBIT MP ACCESS signal on the line 54 is delivered to the bus controller logic 32 to inhibit the bus access until the I/O cycle is completed. The bus controller logic 32 delivers a plurality of bus transceiver enable signals TRANS ENB on the lines 56 to the bus transceivers 30 at inactive levels to prevent the microprocessor's requested address from being presented to the system bus 18 until the current I/O cycle is complete, as is described in more detail below. Further, the bus control logic 32 returns a BRDY- signal on a line 58 to the microprocessor 24 when valid data is ready on the system bus 18 to be burst to the processor 24 in response to the CPU's address request.

Figure 3:
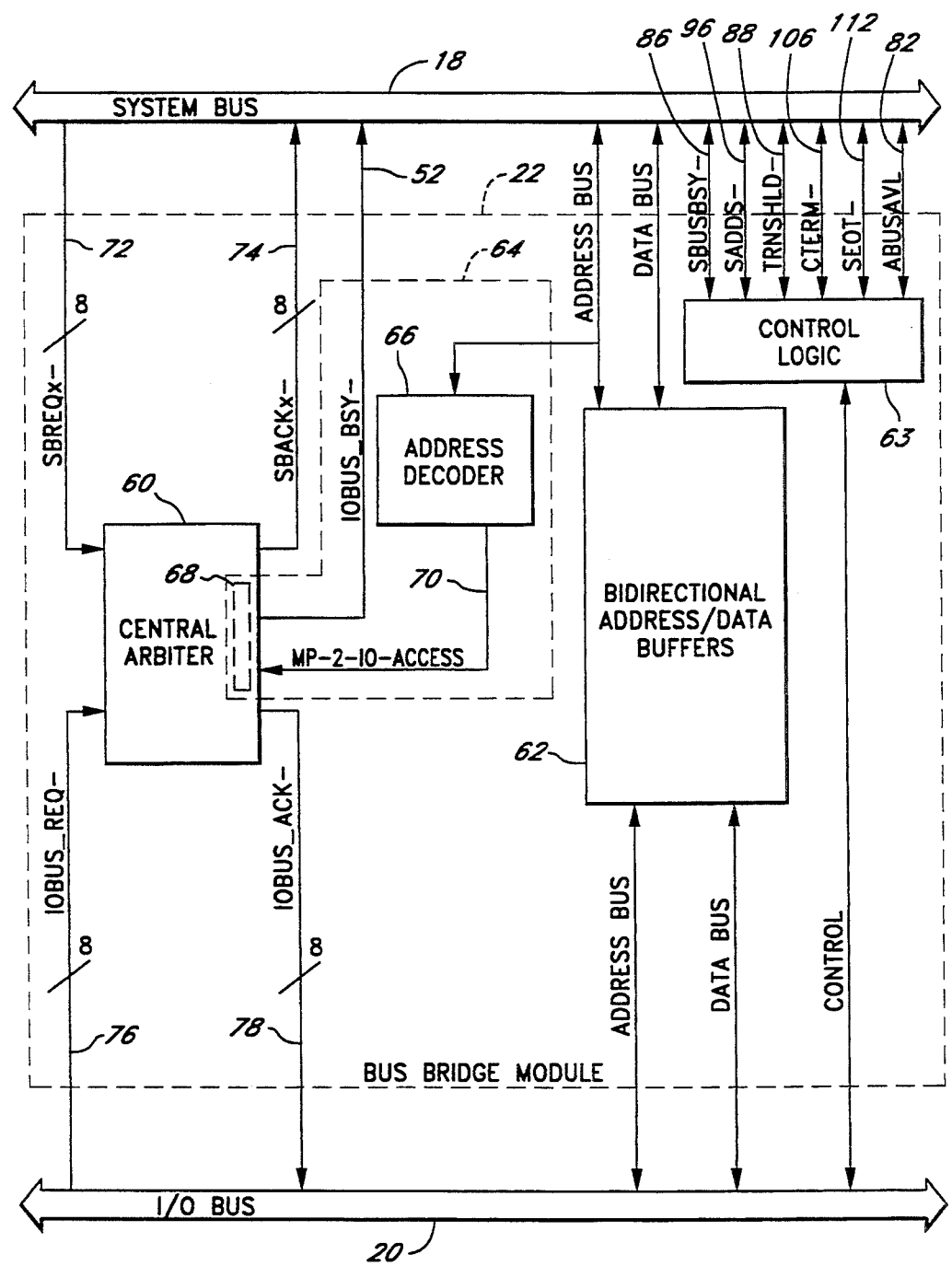
FIG. 3 is a block diagram of a bus bridge incorporating the I/O bus protocol circuit of the present invention and the communication between the bus bridge and the system and I/O buses.

FIG. 3 illustrates a block diagram of a typical bus bridge 22 used in the multiprocessor system 10 of FIG. 1. Preferably, the bus bridge 22 comprises a central arbiter 60, a set of bi-directional address and data buffers 62, and a control logic circuit 63. Preferably, the control logic circuit 63 controls the timing of the I/O cycle and the states of some of the system bus control signals. In accordance with one embodiment of the present invention, the bus bridge 22 further comprises an I/O bus protocol circuit 64. The I/O bus protocol circuit 64 comprises an address decoder 66 and a logic circuit 68. The logic circuit 68 is a part of the central arbiter 60 which is added to implement the signaling protocol of the present invention.

The I/O bus protocol circuit 64 receives the address request from the system bus 18 and delivers it to the address decoder 66. The address decoder 66 determines if the address request on the system bus 18 requires access to the I/O bus 20. The output of the address decoder 42 is a MP-2-IO-ACCESS signal on a line 70, which is an active high signal. If the requested address requires access to the I/O bus 20, the MP-2-IO-ACCESS signal will be active. The MP-2-IO-ACCESS signal on the line 70 is delivered to the central arbiter 60.

The central arbiter 60 receives the decoded MP-2-IO-ACCESS signal on the line 70 and determines if the I/O bus 20 needs to respond to the requested address. The central arbiter 60 controls the granting of the I/O bus 18 to a requesting CPU module 12 and also controls the handshaking signals required to initiate and complete an I/O access. The central arbiter 60 receives the system bus request (SBREQx-) signals on a set of lines 72 (i.e., SBREQ1-, SBREQ2-, . . . SBREQN-) from the respective CPU modules 12. The central arbiter 60 will monitor these requests for the system bus 18 and returns a set of system bus acknowledge (SBACKx-) signals on a set of lines 74 (i.e., SBACK1-, SBACK2-, . . . SBACKN-) to the respective CPU module 12, to indicate to each module when access to the system bus 18 has been granted.

The central arbiter 60 also monitors the I/O requests, i.e., an IOBUS_REQ- signal on a line 76, from the I/O controllers 16 for access to the I/O bus 20. The central arbiter 60 reviews the requests from both the CPU modules 12 and from the I/O controllers 16. However, the central arbiter 60 will grant access to the I/O bus 20 to either one of the I/O controller 16 or to one of the CPU modules 12 at any given time.

When the I/O controller 16 has been granted access to the I/O bus 20, the central arbiter 60 returns an I/O bus acknowledge (IOBUS_ACK-) signal on a line 78. The receipt of the IOBUS_ACK- signal indicates to the I/O controller 16 that it may place its address or data onto the I/O bus 20.

If an I/O controller 16 requests an access to the I/O bus 18 and the I/O bus 20 is available, the central arbiter 60 sets the I/O bus busy (IOBUS_BSY-) signal on the line 52 to an active level. The IOBUS_BSY- signal 52 indicates to all of the CPU modules 12 that the I/O bus 20 has been requested, and the CPU modules 12 will have to hold their I/O request until the current transaction is completed. By preventing the other CPU modules 12 from executing an I/O request, the system bus 18 does not have to be held idle and can be used for memory and CPU Module-to-CPU Module transactions, such as cache hit responses, while the I/O bus 20 is in use.

Additionally, the bus bridge 22 also includes a set of bidirectional address and data buffers 62, which reduces the period of time required for data transfers from the I/O bus 20 to the system bus 18. The buffers 62 on the I/O bus bridge 22 can receive the data from the I/O bus 20 at the slower data rate of the I/O bus 20 and temporarily store the data. While the data is being delivered from the I/O bus 20 to the bus buffers 22, the system bus 18 is free to process other transactions and is not interrupted to receive data at the slower data rate of the I/O bus 20. Once all of the data is stored by the buffers 62, the bus bridge 22 notifies the system bus 18 and bursts all of the data from the buffers 62 onto the system bus 18 at the faster data rate of the system bus 18. This process greatly improves the efficiency of I/O bus 20-to-system bus 18 data transfers.

In the present embodiment, the presentation of the CPU-requested address by the CPU module 12 to the system bus 18 is altered by the bus controller logic 32 and the bus inhibit circuitry 34, as described below. Before the address request is presented to the system bus 18, the bus controller logic 32 and the bus inhibit circuitry 34 check to see if an I/O bus 20 access is required. If an I/O bus access is required, the bus controller must wait for both the system bus 18 and the I/O bus 20 to be available before it places its address and its system address strobe (SADDS-) onto the system bus 18.

Figure 4:
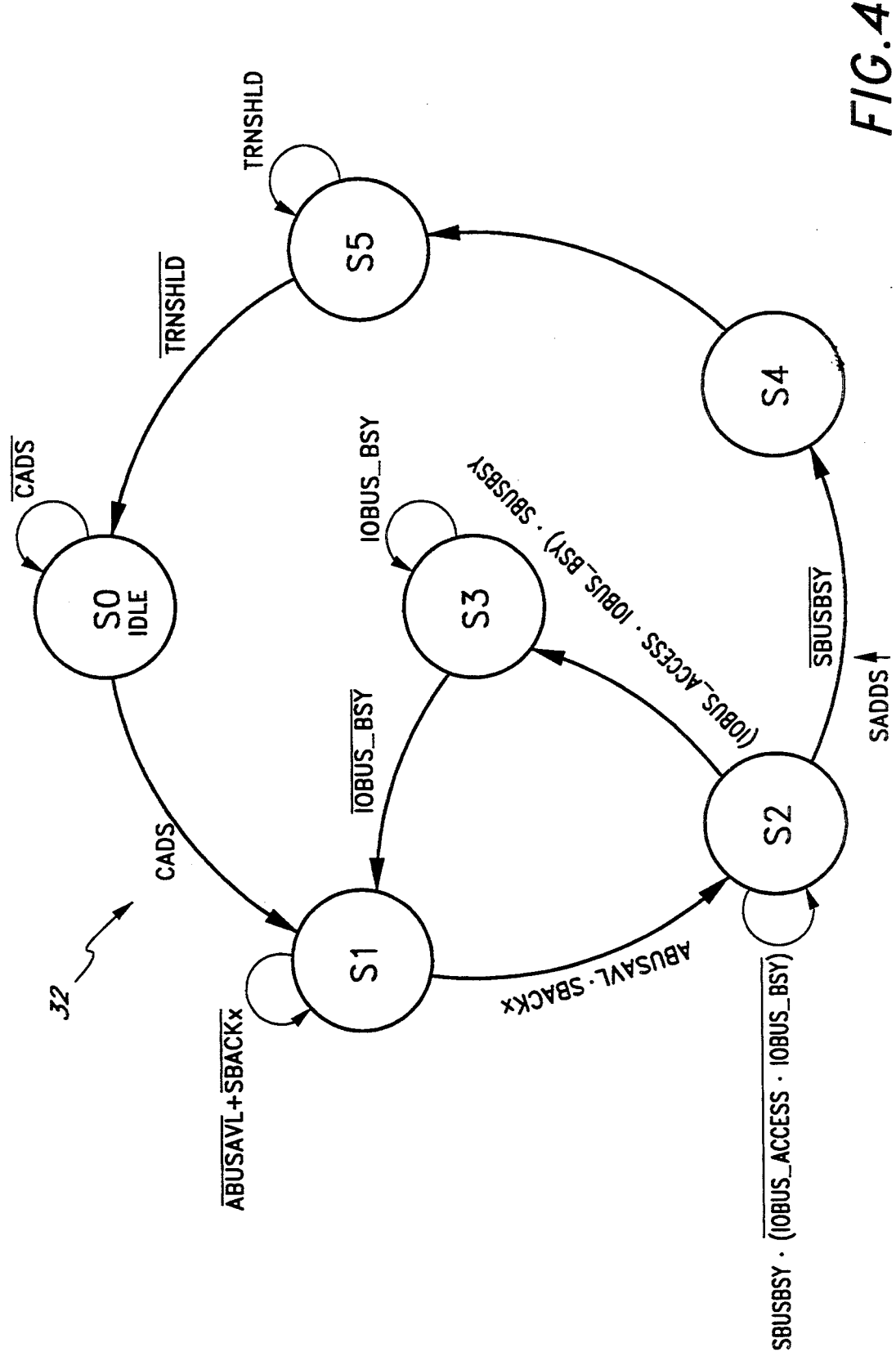
FIG. 4 is a state diagram illustrating the bus control logic of the bus controller on each CPU module which implements the bus signal protocol of the present invention.

Referring to FIGS. 2 and 4, the initiation of an address request, i.e., the generation of a SADDS- signal, by the bus controller 32 on the CPU module 12 incorporating the I/O bus inhibit circuit 34 of the preferred embodiment is described in relation to the state diagram of FIG. 4. Initially, at a state S0 the bus controller 32 awaits the generation of a CPU address strobe (CADS-) signal on a line 80 by the microprocessor 24. The CADS- signal is an active low signal and indicates that the microprocessor 24 is putting out an address request. While the CADS- signal on the line 80 remains inactive, the bus controller 32 remains in the state S0 awaiting an address request. When the CADS-signal on the line 80 becomes active, the bus controller 32 advances to a state S1.

In the state S1 the bus controller 32 checks the status of an address bus available (ABUSAVL) signal on a line 82 and its own system bus acknowledge (SBACKx-) signal on the line 74. The ABUSAVL signal is an active high signal and indicates when the system bus 18 is available to receive an address request from one of the CPU modules 12. The SBACKx-signal is an active low signal that indicates when the system bus 18 has acknowledged the bus request by the CPU module 12. If the ABUSAVL signal is not active, i.e., another CPU module 12 is utilizing the system address bus, and if the SBACKx-signal is not active, i.e., the system bus 18 has not acknowledged the address request by the CPU module 12, and the bus controller 32 remains waiting in state S1.

If the bus controller 32 receives the SBACKx- signal at an active level and receives the ABUSAVL signal at an active level, the bus controller 32 will move to a state S2. In the state S2 the bus controller 32 verifies the state of the system bus busy (SBUSBSY-) signal on a line 86. The SBUSBSY-signal is an active low signal which indicates when the system bus 18 is currently processing a previous transaction initiated by another CPU module 12. If the SBUSBSY- signal on the line 86 is received at an inactive level, the system bus 18 is available, and the bus controller 32 proceeds to a state S4. At the transition from the state S2 to the state S4, the bus controller 32 generates a system address active (SADDS-) signal, which indicates to the system bus 18 that a valid address is being presented.

If the SBUSBSY- signal is active, the bus controller 32 checks the state of the IOBUS_ACCESS signal on the line 42 and the IOBUS_BSY- signal on the line 52. The IOBUS_ACCESS signal is generated by the address and cycle-type decoder 36 on the CPU module 12. If the IOBUS_ACCESS signal is at an active state, the address requested by the microprocessor 24 requires access to the I/O bus 20. The IOBUS_BSY- signal on the line 52, as described above, is generated by the bus bridge 22 and indicates when the I/O bus 20 is currently in use. If the IOBUS_BSY- signal 52 is inactive, and the IOBUS_ACCESS signal is inactive while the SBUSBSY- signal is active, the CPU requested address requires access to the system bus 18, which is currently busy; therefore the bus controller 32 waits at state S2. If the IOBUS_ACCESS signal is active and the IOBUS_BSY- signal is active while the SBUSBSY- signal is active, the requested address requires access to the I/O bus 20, which is currently busy; therefore the bus controller 32 proceeds to a state S3.

In the state S3 the bus controller monitors the status of the IOBUS_BSY- signal. While the IOBUS_BSY-signal is active, indicating the I/O bus 20 is currently busy with another transaction, the bus controller 32 waits in the state S3. Once the IOBUS_BSY- signal is inactive, the bus controller 32 returns to the state S1 where it can again attempt to request the desired address now that the I/O bus 20 is available.

In the state S4, the bus controller 32 immediately proceeds to a state S5. In the state S5 the bus controller 32 monitors the status of a transaction hold (TRNSHLD-) signal on a line 88. The TRNSHLD-signal is an active low signal. The TRNSHLD- signal is driven to an active level by each device connected to the system bus 18 while each device determines whether it has the requested data (i.e., whether the address corresponds to an address to which the device responds). As each device determines that it does not respond to the requested address, it releases the TRNSHLD-signal. While the TRNSHLD- signal on the line 88 is active, the bus controller logic 32 remains in state S5. If the TRNSHLD- signal is inactive, the bus controller logic 32 returns to the S0 state and awaits the next address request.

In a multiprocessor system 10 such as the one described above, each bus controller 32 on each CPU module 12 is constantly moving through the states of the above state diagram with each address requested by its respective microprocessor 24. The interaction of the CPU modules 12 with the system bus 18 and the I/O bus 20 is described with reference to FIGS. 5A–5B as follows.

Figure 5A:
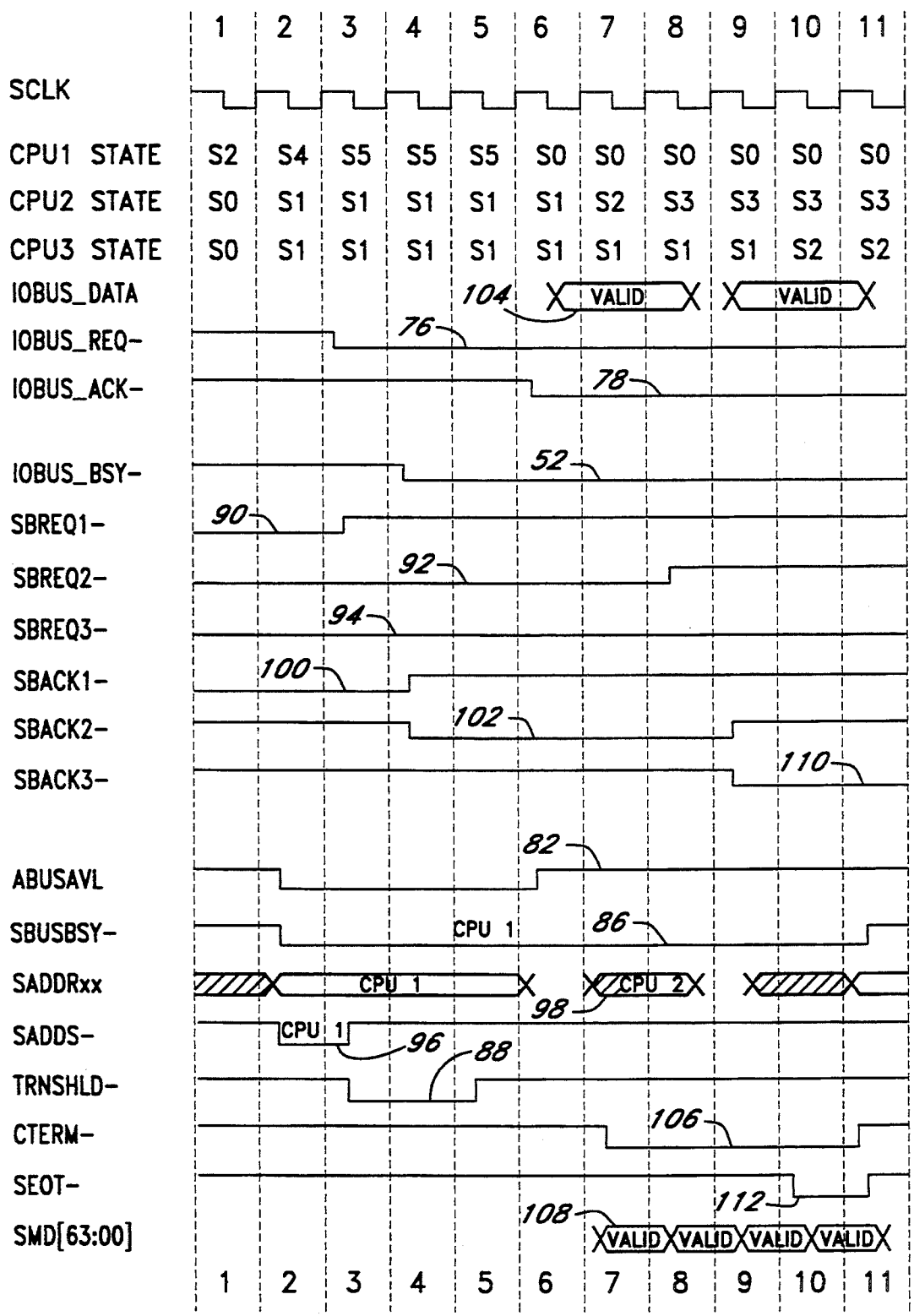
FIG. 5A is a timing diagram illustrating clock cycles 1-11 of an attempted access of the I/O bus by a second CPU module which is inhibited during a concurrent I/O bus access by an I/O controller.
Figure 5B:
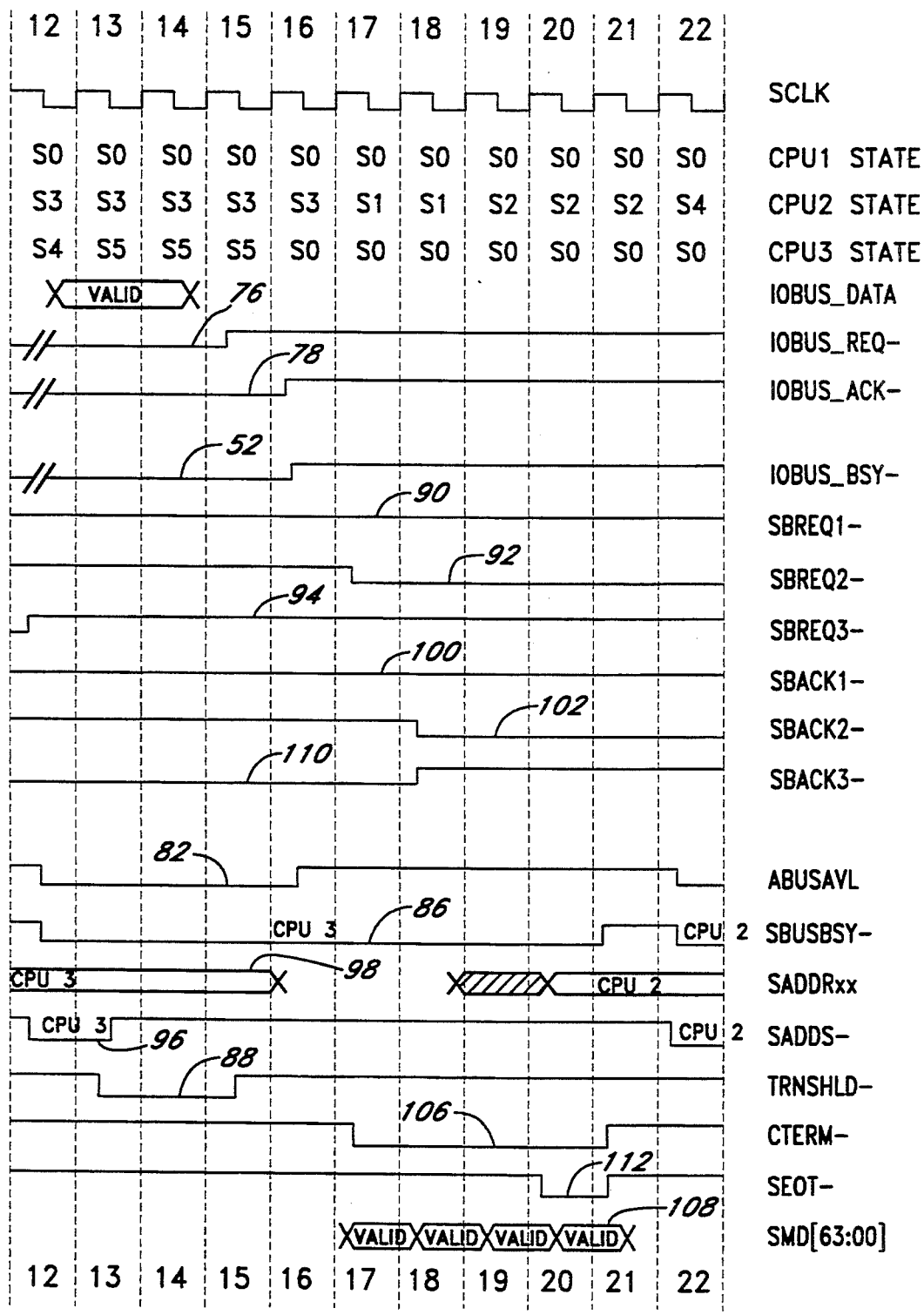
FIG. 5B is a timing diagram illustrating clock cycles 12-22 of an attempted access of the I/O bus by a second CPU module which is inhibited during a concurrent I/O bus access by an I/O controller.

FIGS. 5A–5B illustrate a timing diagram of an I/O cycle of the multiprocessor system which includes the I/O bus protocol of the present invention wherein a second processor is prevented access to the I/O bus 20 after an I/O controller 16 has claimed control of the I/O bus 20. A first microprocessor (CPU 1), a second microprocessor (CPU 2), and a third microprocessor (CPU 3) each initiate a CADS- signal (not shown) to their respective bus controllers 32, corresponding to the state S1 of the state diagram of FIG. 4. Simultaneously, each microprocessor 24 sends a requested address to the bus transceivers 30. The requested address is also routed to the address and cycle type decoder 36, which determines whether the requested address requires an I/O access and, if so, initiates the IOBUS_ACCESS signal (not shown). In the case of CPU module #1, the IOBUS_ACCESS signal is not asserted. Each bus controller 32 sends out a bus request (SBREQx-) signal on the lines 72. Each bus controller 32 awaits the receipt of the system bus acknowledge (SBACKx-) signal on the line 74 as well as the ABUSAVL signal on the line 82 at active levels from the central arbitrator 60, corresponding to the state S1 of the state diagram.

FIG. 5A begins in a clock cycle 1 with the bus request of each CPU module 12 initiated; i.e., the SBREQ1- signal on a line 90, the SBREQ2- signal on a line 92, and the SBREQ3- signal on a line 94. In the clock cycle 1, CPU module #1 has received the SBACK1- signal at an active state, and the bus controllers 32 on CPU module #2 and CPU module #3 modules are waiting for the receipt of their system bus acknowledge (SBACKx-) signals SBACK2- and SBACK3-, respectively. In the clock cycle 1, corresponding to the state S2 of the state diagram for CPU module #1, the bus controller 32 of CPU module #1 awaits the receipt of the SBUSBSY- signal on the line 86 at an inactive level.

As illustrated in FIG. 5A in a clock cycle 2, once the bus controller 32 of CPU module #1 receives the SBUSBSY-signal on the line 86 at an inactive level, the bus controller 32 issues an SADDS- signal on a line 96 at an active level. This occurs at the transition from the state S2 to the state S4 of the state diagram. Also during the clock cycle 2, the system address from CPU module #1 is presented to the system bus 18 via the SADDRxx lines 98. The address is valid from clock cycles 2–5. The devices on the system bus 18 that latch the requested address do so in response to the receipt of the SADDS-signal on the line 96.

In a clock cycle 3, CPU module #1 releases the system bus request signal SBREQ1- on the line 90 as CPU module #1 has already placed the address on the system bus 18, and therefore has been granted use of the system bus 18. At the same time, the TRNSHLD- signal on the line 88 is driven to an active level by each device connected to the system bus while each device determines whether it has the requested data (i.e., whether the address corresponds to an address to which the device responds). As each device determines that it does not respond to the requested address, it releases the TRNSHLD- signal on the line 88. This corresponds to the state S5 of the state diagram. The SADDS- signal on the line 96 is deasserted as the address SADDRxx on the lines 98 has been presented to the system bus 18. Also, in the clock cycle 3, one of the I/O controllers 16 requests access to the I/O bus 20 by asserting the I/O bus request signal, IOBUS REQ-, on the line 76.

In a clock cycle 4, an SBACK1- signal on the line 100 is deasserted, acknowledging the deassertion of the SBREQ1-signalon the line 90. As the system bus 18 is no longer granted to CPU module #1 after the release of the SBACK1- signal on a line 100, the central arbitrator 60 acknowledges the request of the next CPU module 12. In this case, the central arbiter 60 initiates an SBACK2- signal on a line 102 granting the system bus 18 to CPU module #2. In response to the initiation of the IOBUS_REQ- signal on the line 76, the central arbiter 60 initiates the IOBUS_BSY- signal 52 at an active level to prevent the other CPU modules 12 from trying to access the I/O bus 18.

In a clock cycle 5, the last device on the system bus releases the TRNSHLD- signal on the line 88. This is the last cycle that the address SADDRxx on the lines 98 from CPU module #1 is valid on the system bus 18 and corresponds to the transition from state S5 to state S0 of the state diagram.

In a clock cycle 6, the ABUSAVL signal on the line 82 returns to an active level, since the address request from CPU module #1 is no longer valid. The central arbiter 60 on the bus bridge 22 responds with the IOBUS_ACK- signal on the line 78, which indicates to the requesting I/O controller 16 that it has been granted the I/O bus 20. Further, the I/O controller 16 places valid data onto a set of data lines (IO_DATA) 104 of the I/O bus 20. The data signals on the lines 104 are valid from the clock cycle 6 through a clock cycle 14.

With the receipt of the ABUSAVL signal on the line 82 at an active level, and the previous receipt of the SBACK2-signal on the line 102 at an active level, CPU module #2 moves into the state S2 of the bus controller timing diagram in a clock cycle 7. CPU module #2 has already sent its requested address to the bus transceivers 30 and to the address and cycle type decoder 36. The address and cycle type decoder 36 determines whether the requested address requires an I/O access, and, if so, initiates the IOBUS_ACCESS signal (not shown). In the case of CPU module #2, the address request requires access to the I/O bus 20. Thus, the IOBUS_ACCESS signal is asserted at an active level.

In the clock cycle 7, a cycle terminate (CTERM-) signal on a line 106 is asserted by the device having valid data indicating that the data is available. The valid data is presented on a set of data lines SMD[63:00]108 of the system bus 18. Valid data is received by CPU module #1 from the system bus 18 at the leading edge of each of the clock cycles 8–11. Also, in the clock cycle 7, CPU module #2 places its requested address out onto the system bus 18. However, since the IOBUS_BSY-signal on the line 52 is active, the SADDS-signal on the line 96 is not initiated. Without the initiation of the SADDS- signal on the line 96, the address of CPU module #2 is not latched by any of the devices on the system bus 18.

In a clock cycle 8, due to the receipt of the IOBUS BSY-signal on the line 52 at an active level by CPU module #2, the bus controller 32 on CPU Module #2 enters the state S3 and waits for the receipt of the IOBUS_BSY- signal at an inactive level indicating that the current I/O transaction is complete. Additionally, CPU module #2 deasserts its bus request SBREQ2- on the line 92 to enable other CPU modules 12 to access the system bus 18 while it waits for the I/O bus 20 to become available.

In a clock cycle 9, the central arbitrator 60 deasserts the SBACK2- signal on the line 102, acknowledging the deassertion of the SBREQ2- signal on the line 92. As the system bus 18 is no longer granted to CPU module #2 after the release of the SBACK2- signal, the central arbitrator 60 acknowledges the request of the next CPU module 12. In this case the central arbiter 60 initiates an SBACK3- signal on a line 110 to grant the system bus 18 to CPU module #3.

In a clock cycle 10, the device transmitting the data to the system bus 18 strobes a system end of transaction (SEOT-) signal on the line 112 to a low logic level. In a clock cycle 11, CPU module #1 has accepted the data transfer and the CTERM- signal on the line 106 returns to a high logic level. Once both the CTERM- signal on the line 106 is returned at a high logic level and the SEOT- signal on the line 112 is strobed to a low logic level, the SBUSBSY- signal on the line 86 is set at an inactive level because the cycle on the system bus 18 is complete. Also, in the clock cycle 11, CPU module #3 places a valid address SADDRxx on the system address bus address lines 98. The address on the lines 98 is valid during the clock cycles 11–15.

Previously, CPU module #3 received the microprocessor requested address at the address and cycle type decoder 36 on CPU module #3. The address and cycle type decoder 36 determines whether the requested address requires an I/O access and, if so, initiates the IOBUS_ACCESS signal (not shown). In the case of CPU module #3, the IOBUS_ACCESS signal is set at an inactive level because an I/O access is not required. The bus controller 32 on CPU module #3 has already received the system bus acknowledge (SBACK3-) signal on the line 110, as well as the ABUSAVL signal on the line 82 at active levels and is therefore in state S2 of the state diagram. With the receipt of the SBUSBSY- signal on the line 86 at an inactive level, CPU#3 asserts the SADDS- signal on the line 96 in a clock cycle 12, as illustrated in FIG. 5B. This occurs at the transition from the state S2 to the state S4 of the state diagram. The devices on the system bus 18 that latch the address do so in response to the receipt of the SADDS- signal on the line 96. With the assertion of the SADDS- signal on the line 96, the system address bus is no longer available; therefore the ABUSAVL signal on the line 82 is driven to an inactive level. Finally, the SBUSBSY- signal on the line 86 is asserted, indicating that the system bus 18 is busy with the requested operation of CPU module #3. Also, in the clock cycle 12, after the issuance of the SADDS-signal on the line 96, CPU module #3 releases the system bus request line SBREQ3- on the line 94 because CPU module #3 has already placed a requested address on the system bus 18, and therefore has been granted use of the system bus 18.

In a clock cycle 13, the TRNSHLD- signal on the line 88 is driven to an active level by each device connected to the system bus 18 while each device determines whether it has the requested data. As each device determines that it does not respond to the requested address, it releases the TRNSHLD-signal. This corresponds to the state S5 of the state diagram. The SADDS- signal on the line 96 is deasserted since the address has been presented to the system bus 18. In a clock cycle 14, the last piece of valid data is delivered from the I/O controller 16 to the I/O bus 20.

In a clock cycle 15, the I/O controller 16 deasserts its bus request, IOBUS_REQ-, signal on the line 76 to enable other devices to access the I/O bus 20 since its cycle is complete. Additionally, the last device on the system bus 18 releases the TRNSHLD- signal on the line 88, in response to the request from CPU module #3. The release of the TRNSHLD-signal corresponds to the transition from state S5 to state S0 of the state diagram. In the state S0, the bus controller 32 of CPU module #3 awaits the next address request from its microprocessor 24.

In a clock cycle 16, the IOBUS_ACK- signal on the line 81 acknowledges the deassertion of the IOBUS_REQ- signal on the line 76. As the I/O bus 20 is no longer in use, the IOBUS_BSY- signal on the line 52 is returned to an inactive state. With the deassertion of the IOBUS_BSY- signal on the line 52, the bus controller 32 of CPU module #2 returns to the state S1 of the state diagram and once again attempts to access the I/O bus 20, which is now available. As the address request on the system bus 18 from CPU module #3 is no longer valid, the address bus is available for additional transactions. Thus, in the clock cycle 16, the ABUSAVL signal on the line 82 is deasserted.

In a clock cycle 17, CPU#2 again requests access to the system bus 18 by initiating the SBREQ2- signal on the line 92. Additionally, the cycle terminate (CTERM-) signal on the line 106 is asserted by the device on the system bus 18 that has valid data to indicate that the data is available. The valid data is presented to the system bus data lines SMD[63:00] 108. Valid data is received by CPU module #3 from the system bus 18 at the leading edge of each the clock cycles 18–21.

In a clock cycle 18, the SBACK3- signal on the line 110 is deasserted, acknowledging the deassertion of the SBREQ3-signal on the line 94. As the system bus 18 is no longer held for CPU module #3 after the release of the SBACK3-signal on the line 110, the central arbiter 60 acknowledges the request of the next CPU module 12. In this case, the central arbiter 60 initiates the SBACK2- signal on the line 102, acknowledging CPU module #2.

With the receipt of the ABUSAVL signal on the line 82 at an active level and the previous receipt of the SBACK2-signal on the line 102 at an active level, CPU module #2 moves into the state S2 of the bus controller state diagram in a clock cycle 19. As indicated above, since the address requested by CPU module #2 requires access to the I/O bus 20, the IOBUS_ACCESS signal on CPU module #2 is set at an active level (not shown).

In a clock cycle 20, CPU module #2 places its address SADDRxx out onto the system address bus on lines 98. However, since the SBUSBSY- signal on the line 86 is still active, the SADDS- signal on the line 96 is not initiated. Without the initiation of the SADDS-signal on the line 96, the address of CPU module #2 is not latched by any of the devices on the system bus 18. Additionally, in the clock cycle 20, the device transmitting the data to the system bus 18 in response to CPU module #2 request strobes the system end of transaction (SEOT-) signal on the line 112 to a low logic level.

In a clock cycle 21, CPU module #3 has accepted the data transfer and the CTERM- signal on the line 106 is returned to a high logic level. Once both the CTERM-signal on the line 106 is returned high and the SEOT-signal on the line 112 is strobed to a low logic level, the SBUSBSY- signal on the line 86 returns to an inactive level because the cycle on the system bus 18 is complete.

With the receipt of the SBUSBSY- signal on the line 86 at an inactive level, CPU module #3 asserts the SADDS- signal on the line 96 in a clock cycle 22. This occurs at the transition from the state S2 to the state S4 of the state diagram. The devices on the system bus 18 that latch the address do so in response to the receipt of the SADDS- signal on the line 96. With the assertion of the SADDS- signal, the system address bus is no longer available for access by the other CPU modules 12. Therefore the ABUSAVL signal on the line 82 is driven to an inactive level. Finally, the SBUSBSY- signal on the line 86 is asserted, indicating that the system bus is busy with the requested operation of CPU module #2. The remainder of the I/O cycle is completed in the manner described above.

As illustrated in FIGS. 5A-5B and as described above, the IOBUS BSY- signal on the line 52 is initiated during the clock cycle following the initiation of the IOBUS_REQ- signal on the line 76. However, the IOBUS ACK- signal on the line 78 is not initiated at the same time as the IOBUS BSY- signal on the line 52 to prevent the problems associated with an attempted concurrent access of the I/O bus 20 by one of the CPU modules 12 and one of the I/O controllers 16. The CPU modules 12 can request an I/O address as long as they have not received the IOBUS BSY- signal on the line 52. Therefore it is possible for an I/O controller 16 to request the I/O bus 20 at the same time that a CPU module 12 is requesting the I/O bus 20. Since it takes one clock cycle after the generation of the IOBUS_BSY- signal on the line 52 by the bus protocol circuit 64 before the CPU module 12 receives the IOBUS BSY- signal on the line 52, the central arbiter 60 needs to wait at least one cycle before it grants the I/O bus 18 to the I/O controller 16 to check to see if a concurrent CPU module access has occurred.

In the preferred embodiment illustrated in FIGS. 5A-5B, after an IOBUS_REQ- signal has been received, the IOBUS_ACK- signal is initiated two clock cycles after the assertion of the IOBUS_BSY- signal. Two clock periods are sufficient to determine if one of the CPU modules 12 requested an address on the I/O bus 20 at the same time that the IOBUS_BSY- signal was initiated in response to the I/O controllers 16 request. After the two clock periods, the CPU modules 12 are assured to have received the IOBUS BSY- signal on the line 52 and will no longer request an I/O bus access until the IOBUS_BSY- signal on the line 52 is deasserted. In the case where a concurrent access is detected, the CPU module 12 is granted the use of the I/O bus 20, since the termination of the CPU module's request would cause an error condition to be detected by the microprocessor 24. Since the CPU module 12 is granted the I/O bus 20, the requesting I/O controller 16 does not receive the IOBUS_ACK- signal until after the CPU module's cycle is complete.

Figure 6A:
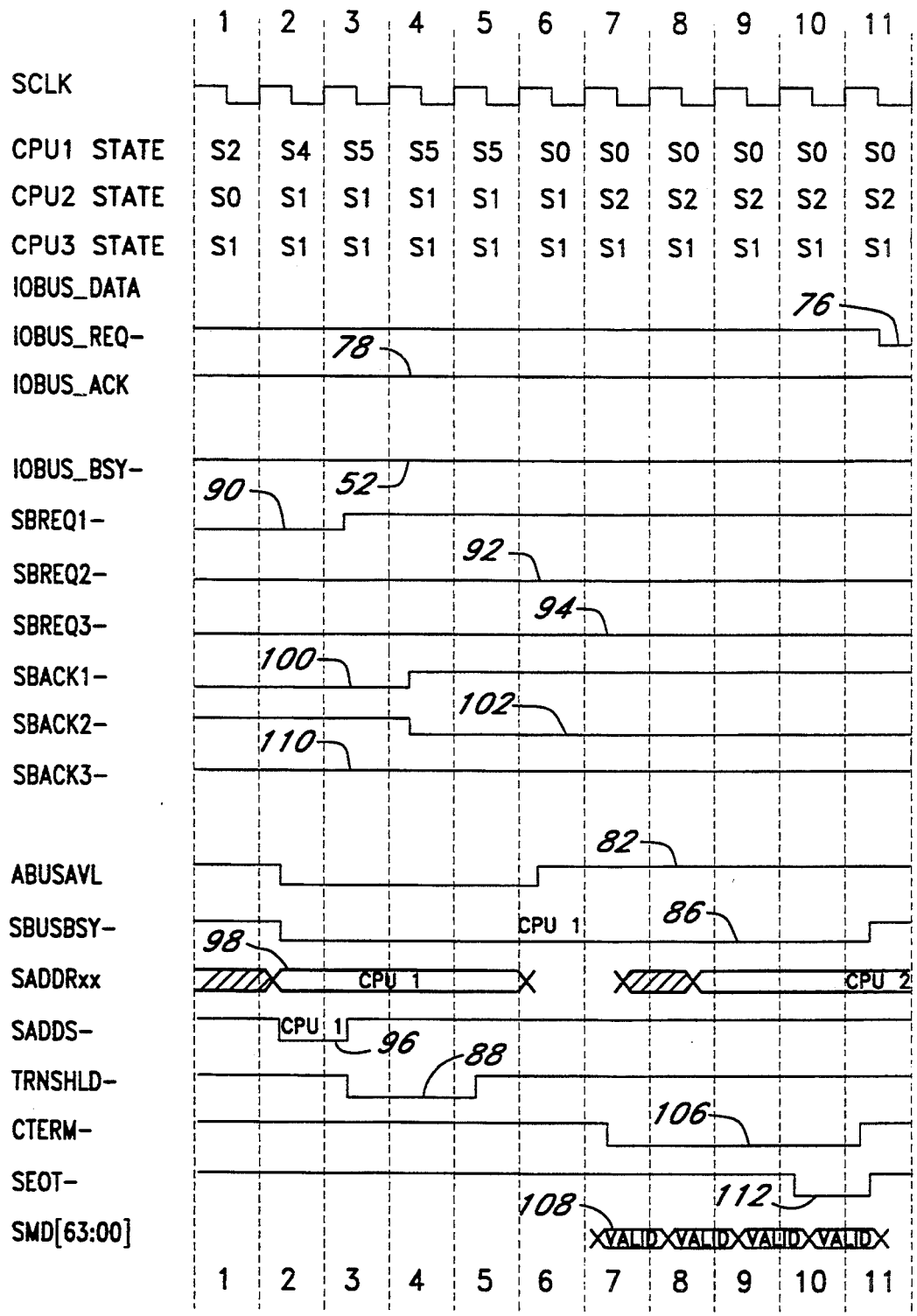
FIG. 6A is a timing diagram illustrating clock cycles 1-11 of an attempted access of the I/O bus by a CPU module which is not inhibited, because it occurs simultaneously with an I/O bus request by an I/O controller.
Figure 6B:
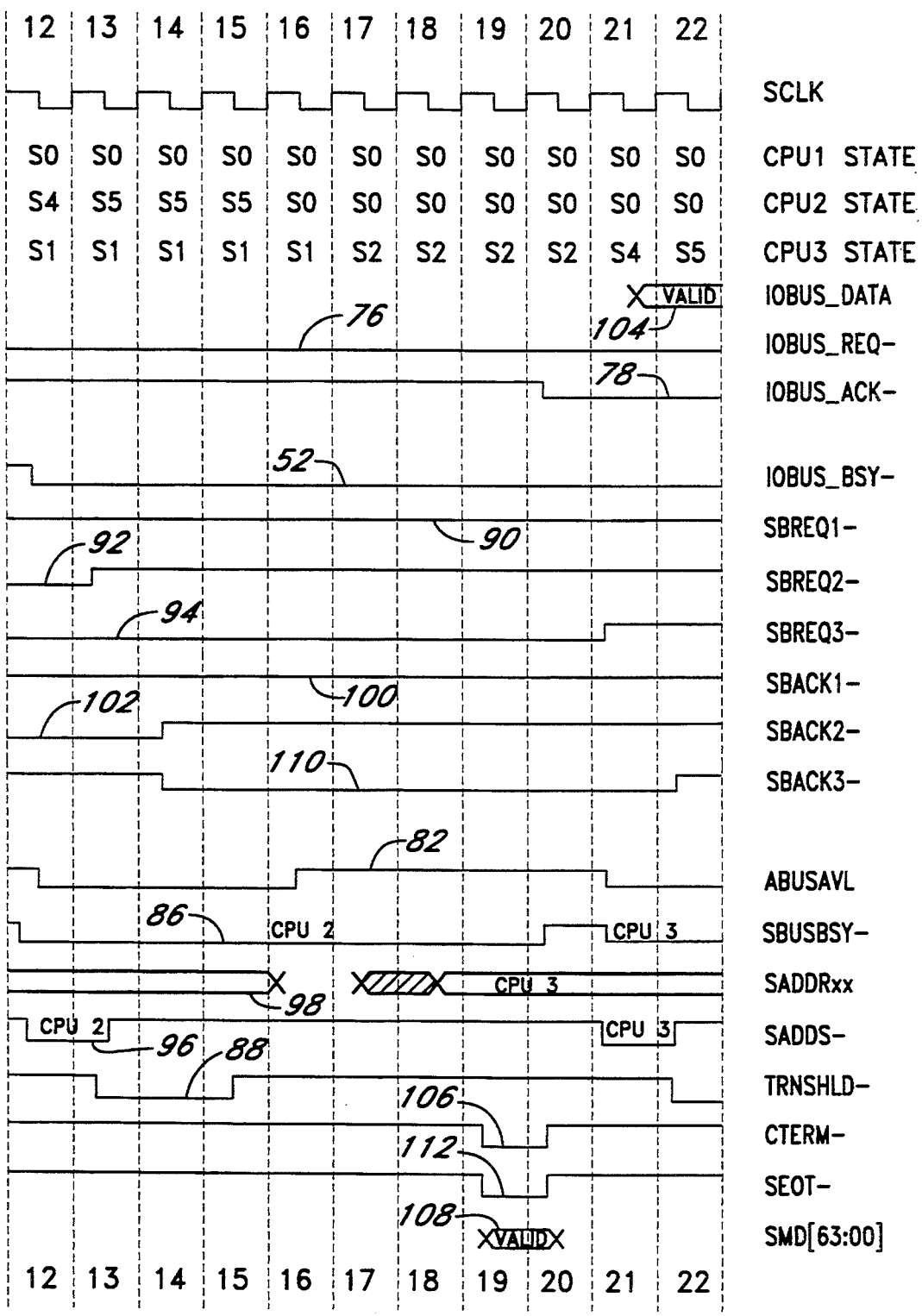
FIG. 6B is a timing diagram illustrating clock cycles 12-22 of an attempted access of the I/O bus by a CPU module which is not inhibited, because it occurs simultaneously with an I/O bus request by an I/O controller.

FIGS. 6A-6B illustrate a case where CPU module #2 requests access to the I/O bus 20 at the same time that the IOBUS_BSY- signal on the line 52 is initiated in response to an IOBUS REQ- from an I/O controller 16.

In a clock cycle 1, the bus request of each CPU module 12 is initiated (i.e., SBREQ1-, SBREQ2- and SBREQ3- signals on the lines 90, 92, 94, respectively, are initiated). CPU module #1 has received the SBACK1- signal on the line 100 at an active state. The bus controllers 32 on CPU module #2 and CPU module #3 are awaiting the receipt of their system bus acknowledge signals, SBACK2- on the line 102 and SBACK3- on the line 110, respectively. In the clock cycle 1, corresponding to the state S2 of the state diagram for CPU module #1, the SBUSBSY- signal on the line 86 is at an inactive level and the ABUSAVL signal on the line 82 is at an active level.

In a clock cycle 2, the system address from CPU module #1 is presented to the system bus 18 via the SADDRxx lines 98. The address is valid during the clock cycles 2-5. Also, during the clock cycle 2, since the SBUSBSY- signal is inactive and the ABUSAVL signal is active, the bus controller 32 on CPU module #1 issues an SADDS- signal on the line 96 at an active level. This occurs at the transition from the state S2 to the state S4 of the state diagram. The devices on the system bus 18 that latch the address do so in response to the receipt of the SADDS- signal on the line 96.

In a clock cycle 3, CPU module #1 releases the system bus request line, SBREQ1-, on the line 90 because CPU module #1 has already placed its address on the system bus 18, and therefore has been granted use of the system bus 18. At the same time, the TRNSHLD- signal on the line 88 is driven to an active level by each device connected to the system bus 18 while each device determines whether it has the requested data. As each device determines that it does not respond to the requested address, it releases the TRNSHLD- signal. This assertion of the TRNSHLD- signal on the line 88 corresponds to state S5 of the state diagram. Additionally, the SADDS-signal on the line 96 is deasserted since the address has been presented to the system bus 18.

In a clock cycle 4, the SBACK1- signal on the line 100 is deasserted, acknowledging the deassertion of the SBREQ1-signal on the line 90. As the system bus 18 is no longer granted to CPU module #1 after the release of the SBACK1-signal, the central arbitrator 60 acknowledges the request of the next CPU module 12. In this case, the central arbiter 60 initiates the SBACK2-signal on the line 102 for granting the system bus 18 to CPU module #2.

In a clock cycle 5, the last device on the system bus 18 releases the TRNSHLD- signal on the line 88. This is the last cycle that the requested address from CPU module #1 is valid on the system bus 18 and corresponds to the transition from state S5 to state S0 of the state diagram. At this point, CPU module #1 remains in the state S0 awaiting the next address request from the microprocessor 24.

In a clock cycle 6, the ABUSAVL signal on the line 82 returns to an active level, because the address request from CPU module #1 is no longer valid. With the receipt of the ABUSAVL signal on the line 82 at an active level and the previous receipt of the SBACK2- signal on the line 102 at an active level, CPU module #2 moves into the state S2 of the bus controller timing diagram in a clock cycle 7. CPU module #2 has already received the microprocessor's requested address at the bus transceivers 30 and at the address and cycle type decoder 36. The address and cycle type decoder 36 determines whether the CPU requested address requires an I/O access and, if so, initiates the IOBUS_ACCESS signal (not shown). In the case of CPU module #2, the address request requires access to the I/O bus, thus the IOBUS_ACCESS signal is asserted at an active level (not shown).

In a clock cycle 7, the cycle terminate, CTERM-, signal on the line 106 is asserted by the device having the data requested by CPU module #1 indicating that the data is available. The valid data is presented to the system bus 18 on the data lines SMD[63:00]108. Valid data is received by CPU module #1 from the system bus 18 at the leading edge of each of the clock cycles 8-11.

In a clock cycle 9, CPU module #2 places its address SADDRxx out onto the system bus 18 address lines 98. However, since the SBUSBSY- signal on the line 86 is at an active level, the SADDS- signal on the line 96 is not initiated. Without the initiation of the SADDS- signal on the line 96, the address of CPU module #2 is not latched by any of the devices on the system bus 18. In a clock cycle 10, the device transmitting the data to CPU module #1 strobes the system end of transaction (SEOT-) signal on the line 112 to an active level.

In a clock cycle 11, CPU module #1 has accepted the data transfer from the device and the CTERM- signal on the line 106 is returned to an inactive level. Once both the CTERM-signal on the line 106 is returned inactive and the SEOT-signal on the line 112 is strobed an at active level, the SBUSBSY-signal on the line 86 returns to an inactive level because the cycle on the system bus 18 is complete. Also, in the clock cycle 11, one of the I/O controllers 16 requests access to the I/O bus 20 by asserting the I/O bus request signal IOBUS_REQ- on the line 76.

In a clock cycle 12, in response to the initiation of the IOBUS_REQ- signal on the line 76, the I/O bus protocol circuit 64 initiates the IOBUS_BSY- signal on the line 52 at an active level to prevent the other CPU modules 12 from trying to access the I/O bus 20. However, with the receipt of the SBUSBSY- signal on the line 86 at an inactive level, CPU module #2 also asserts the SADDS- signal on the line 96 in the clock cycle 12. This occurs at the transition from the state S2 to the state S4 of the state diagram.

As described above, in the case where one of the CPU modules 12 initiates the SADDS- signal on the line 96 with an I/O request at the same time that the IOBUS_BSY- signal on the line 52 is initiated in response to a request from an I/O controller 16, the requesting CPU module 12 is granted the I/O bus 20. The I/O controller 16 must wait for the CPU module's cycle to complete before it receives the IOBUS_ACK-signal on the line 78. Since CPU module #2 is granted the I/O bus 20, the IOBUS_BSY- signal on the line 52 remains asserted for the remainder of CPU module #2's I/O cycle. With the assertion of the SADDS- signal on the line 96, the system address bus is no longer available. Therefore, the ABUSAVL signal on the line 82 is driven to an inactive level. Finally, the SBUSBSY- signal on the line 86 is asserted, indicating that the system bus 18 is busy with the request of CPU module #2.

In a clock cycle 13, after the issuance of the SADDS- signal on the line 96, CPU module #2 releases the system bus request signal SBREQ2- on the line 92 because CPU module #2 has already placed the requested address on the system bus 18, and therefore has been granted use of the system bus 18. Also, in the clock cycle 13, the TRNSHLD- signal on the line 88 is driven to an active level by each device connected to the system bus while each device determines whether it has the requested data. As each device determines that it does not respond to the requested address, it releases the TRNSHLD- signal. This corresponds to the state S5 on the state diagram. Finally, the SADDS- signal on the line 96 is deasserted since the address has been presented to the system bus 18.

In a clock cycle 14, the central arbiter 60 deasserts the SBACK2- signal on the line 102, acknowledging the deassertion of the SBREQ2- signal on the line 92. Because the system bus 18 is no longer granted to CPU module #2 after the release of the SBACK2- signal on the line 102, the central arbiter 60 acknowledges the request of the next CPU module 12. In this case the central arbiter 60 initiates the SBACK3- signal on the line 110, acknowledging the request of CPU module #3.

In a clock cycle 15, the last device on the system bus 18 releases the TRNSHLD- signal on the line 88. This corresponds to the transition from state S5 to state S0 of the state diagram. At this point the bus controller 32 on CPU module #2 remains in the state S0 until the microprocessor 24 requests a new address. In a clock cycle 16, because the address request on the system bus 18 from CPU module #2 is no longer valid, the address bus is available for additional transactions; thus the ABUSAVL signal on the line 82 is asserted. This corresponds to the state S2 of the state diagram for CPU module #3.

In a clock cycle 18, CPU module #3 places its address out onto the system bus 18. However, since the SBUSBSY-signal on the line 86 is still active, the SADDS- signal on the line 96 is not initiated. Without the initiation of the SADDS- signal on the line 96, the address of CPU module #3 is not latched by any of the devices on the system bus.

In a clock cycle 19, the cycle terminate (CTERM-) signal on the line 106 is asserted by the control logic 63 on the bus bridge. Additionally, the control logic 63 on the bus bridge 22 strobes the system end of transaction (SEOT-) signal on the line 112 low. The valid data from the I/O bus 20 is presented to the system bus data lines SMD[63:00]108 by the bus buffers 62 on the bus bridge 22.

The buffers 62 on the I/O bus bridge 22 have previously received the data from the I/O bus 20 at the slower data rate of the I/O bus 20 and have temporarily stored the data. At clock cycle 19, once all of the data is stored by the buffers 62, the bus bridge 22 bursts all of the data from the buffers 62 onto the system bus 18 in one clock cycle at the faster data rate of the system bus 18. Valid data is received by CPU module #2 from the system bus 18 at the leading edge of a clock cycle 20.

In the clock cycle 20, CPU module #2 has accepted the data transfer and the CTERM- signal on the line 106 returns to a high level. Once both the CTERM- signal on the line 106 is returned high and the SEOT- signal on the line 112 is strobed low, the SBUSBSY- signal on the line 86 returns high, since the cycle on the system bus 18 is complete. Since valid data has been transferred from the I/O bus 20 to the bus buffers 62 and then to the system bus 18, the I/O bus transaction of CPU module #2 has been completed. The central arbitrator 60 initiates IOBUS ACK- signal on the line 78 to enable the I/O controller 16 to receive control of the I/O bus 20. The IOBUS_BSY- signal on the line 52 remains active while the I/O controller 16 completes its transaction.

In a clock cycle 21, CPU module #3 is allowed to proceed with its address request because it is attempting to access system memory and not the busy I/O bus 20. With the receipt of the SBUSBSY- signal on the line 86 at an inactive level, CPU module #3 asserts the SADDS- signal on the line 96. This occurs at the transition from the state S2 to the state S4 of the state diagram. With the assertion of the SADDS- signal on the line 96, the system address bus is no longer available; therefore the ABUSAVL signal on the line 82 is driven to an inactive level. Finally, the SBUSBSY- signal on the line 86 is asserted, indicating that the system bus 18 is busy with the requested operation of CPU module #3. The system bus request of CPU module #3 is completed in the manner described above in association with CPU module #1 of FIGS. 6A–6B.

Also, in the clock cycle 21, valid data is available on the I/O bus 18 in response to the cycle request by the I/O controller 16. The remainder of the I/O cycle is completed in the manner described above in association with FIGS. 5A–5B. After the I/O cycle is complete, the IOBUS_BSY- signal on the line 52 is deasserted (not shown).

Figure 7:
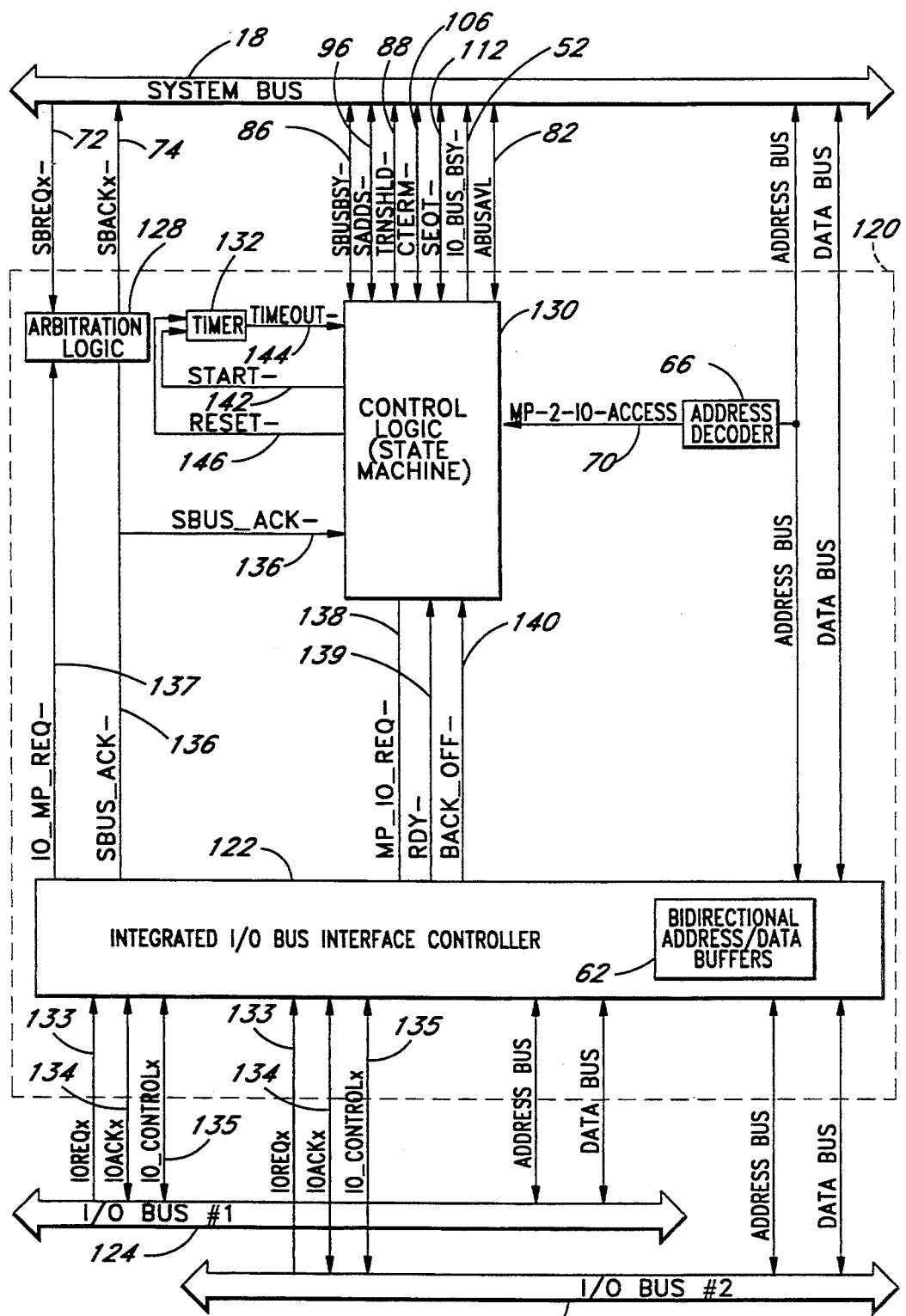
FIG. 7 is a block diagram of an alternate embodiment of the bus bridge incorporating an alternate embodiment of the I/O bus protocol circuit of the present invention.

FIG. 7 illustrates an alternate embodiment of the bus bridge 120 in which part of the functionality of the central arbiter 60 and part of the functionality of control logic 63 is replaced with a highly integrated I/O bus interface controller circuit 122. The highly integrated I/O bus interface circuit 122 is of a conventional design, such as the four chip set part numbers 82433LX, 82434LX, 82374EB, and 82375EB available from Intel, which provides the necessary bus control logic to interface between a system bus 18 and two I/O buses (i.e., an I/O bus #1 124 and an I/O bus #2 126). Preferably, the bus interface circuit 122 is able to interface with both EISA-type and PCI-type I/O buses. When the bus interface circuit 122 is used in the multiprocessor system 10, the I/O bus inhibit circuitry 34 on each of the CPU modules 12 need not be altered. However, the bus controller logic 32 is replaced with an alternate embodiment 150 of the bus controller logic, as described below. Additionally, the signals that interface between the system bus 18 and the I/O buses 124, 126 will be slightly altered.

The alternate embodiment of the of the bus bridge 120 preferably comprises a highly integrated I/O bus interface circuit, an arbitration logic circuit 128, control logic 130, and a timer circuit 132. The control logic circuit 130 preferably comprises a state machine, as will be described in more detail below, which controls the timing of the I/O cycle. Preferably, the arbitration logic circuit 128 receives the SBREQx- signals on the lines 72 (i.e., the SBREQ1- signal on the line 90, the SBREQ2- signal on the line 92, and the SBREQ3- signal on the line 94) from the system bus 18 and returns the system bus acknowledge signals (SBACKx-) on the lines 74 (i.e., the SBACK1- signal on the line 100, the SBACK2- signal on the line 102, and the SBACK3-signal on the line 110) to indicate to each of the CPU modules 12 when it has been granted access to the system bus 18. Each of the I/O buses 124, 126 transmits an I/O request signal (IOREQx) on the lines 133 to the highly integrated I/O bus interface circuit 122 which processes the I/O bus requests. Once the requesting I/O bus 124, 126 has been granted access, the highly integrated I/O bus circuit 122 returns an I/O bus acknowledge signal (IOACKx) on the lines 134 at an active state. Additionally, the highly integrated I/O bus circuit 122 controls a plurality of control signals (IO_CONTROLx) on the lines 135 which controls the operation of the I/O buses 124, 126.

If one of I/O buses 124, 126 wishes to transfer data to the system bus 18, the highly integrated I/O bus interface circuit transmits an IO_MP_REQ- signal on a line 137 to the arbitration logic 128. The arbitration logic 128 answers the I/O bus request with a system bus acknowledge signal (SBUS_ACK-) on a line 136 which is received by the highly integrated I/O bus circuit 122. If one of the CPU modules 12 wishes to transfer data to one of the I/O buses 124,126, the highly integrated I/O bus interface circuit 122 receives an MP_IO_REQ- signal on the line 138 from the control logic circuit 130. When the I/O buses 124, 126 are available to receive the data from the system bus 18, the highly integrated I/O bus circuit 122 sends a RDY- signal on the line 139 at an active state to the control logic circuit 130. When the I/O buses 124, 126 are busy with a transaction, the highly integrated I/O bus circuit 122 sends a BACK_OFF-signal on the line 140 at an active state to the control logic circuit 130.

Figure 8:
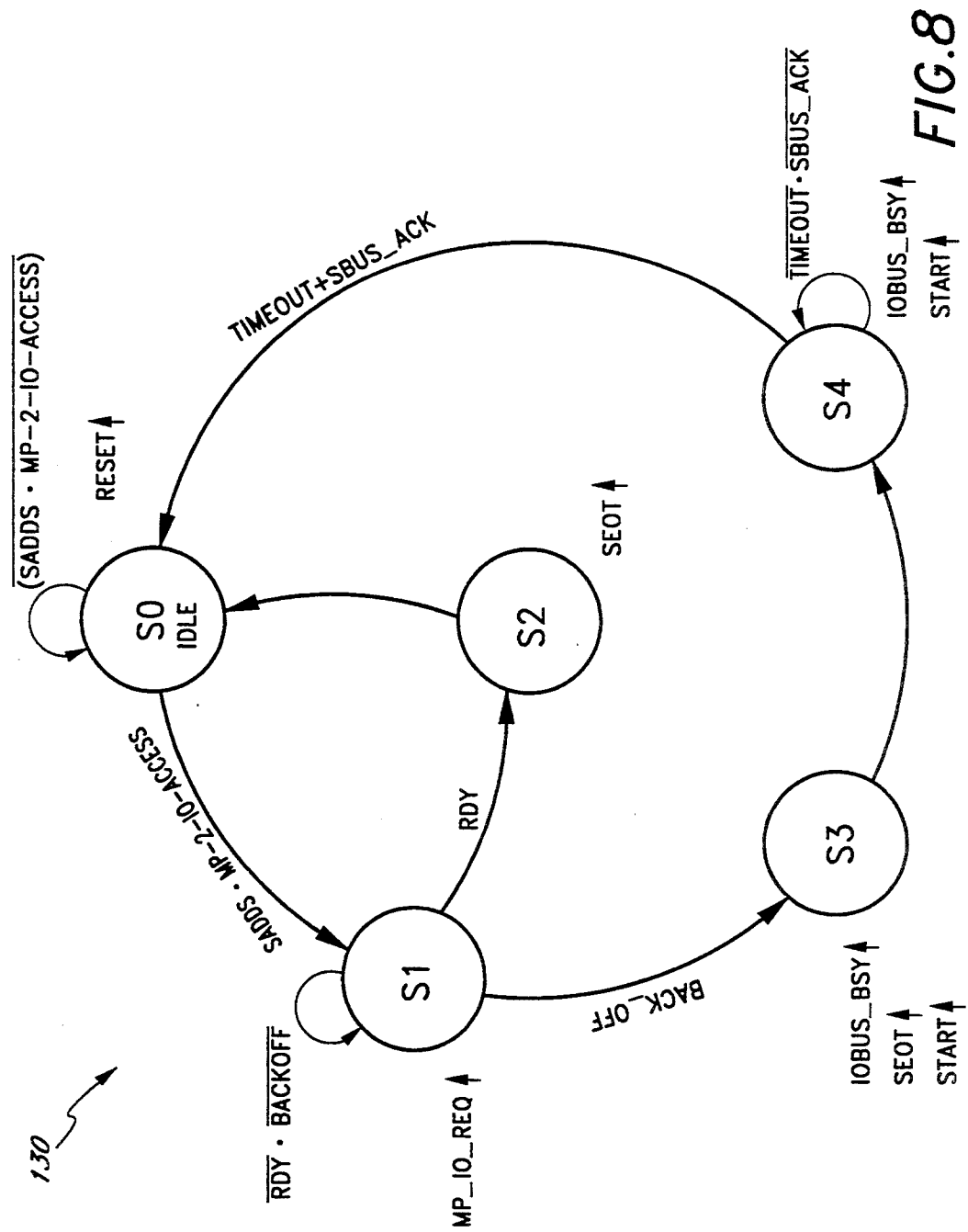
FIG. 8 is a state diagram illustrating the control logic on the alternate embodiment of bus bridge which implements the bus signaling protocol of the present invention.

Referring also to FIG. 8, the state machine in the control logic circuit 130 on the bus interface circuit 122 is described in association with the illustrated state diagram. Beginning in a state S0, the control logic circuit is in an idle state and awaits the receipt of a SADDS- signal on the line 96 at an active state. As described above, the SADDS-signal is generated by a CPU module 12 after it places a valid address SADDRxx signal on the line 98 of the system bus 18. Once the valid address is presented to the system bus 18, the bus bridge 120 receives the address and sends it to the address decoder 66. The address decoder 66 determines if the requested address requires access to either of the I/O buses 124, 126, respectively. If the requested address requires access to one of the I/O buses 124,126, the address decoder 66 initiates the MP-2-IO-ACCESS signal on the line 70.

The state machine of the control logic circuit 130 remains in the S0 state until the SADDS- signal on the line 96 is received in an active state and the MP-2-IO-ACCESS signal on the line 70 is received in an active state and then it will advance to a state S1. In the state S1, the state machine checks the availability of the I/O buses by monitoring the bus-ready signal (RDY-) on a line 139. Additionally, the control logic 130 checks on the status of the back off (BACK_OFF-) signal on a line 140 from the I/O buses 124, 126. The BACK OFF- signal on the line 140, when active, informs the control logic 130 that the current transaction must be terminated because the I/O buses 124, 126 are currently busy with a transaction. If neither the RDY-signal on the line 139 nor the BACK_OFF- signal on the line 140 is in an active state, the control logic 130 remains in the state S1. If the RDY- signal on the line 139 is at an active state, the control logic 130 proceeds to a state S2 of the state machine. If the BACK OFF- signal on the line 140 is at an active state, the control logic 130 proceeds to a state S3 of the state machine.

In the state S2, the control logic 130 awaits the completion of the I/O bus 20-to-system bus 18 transfer and at the completion of the transfer initiates the SEOT- signal on the line 112, indicating that the last piece of valid data is being transferred. At the completion of the transfer, the control logic 130 returns to the state S0 and awaits the next I/O bus request.

In the state S3, the control logic 130 has determined that the requested I/O buses 124, 126, are currently busy with a cycle. The control logic 130 sets the IOBUS_BSY- signal on the line 52 to an active level to inform the requesting CPU module 12, as well as the other CPU modules 12, that the I/O bus 20 is currently busy with a transaction. Additionally, the control logic 130 returns the SEOT- signal on the line 112 at an active level, indicating that the cycle has been terminated. When the requesting CPU module 12 receives the SEOT- signal on the line 112 at an active level at the same time that it receives an IOBUS_BSY- signal on the line 52 at an active level, the alternate embodiment of the bus controller 150 on the CPU module 12 determines that the I/O bus 20 is busy and its requested I/O access has been terminated. The requesting CPU module 12 will remove its address and will wait for the IOBUS_BSY- signal to become inactive and will try the request again. Meanwhile, the remaining CPU modules 12 are monitoring the IOBUS_BSY- signal on the line 52, as described above. The remaining CPU modules 12 will not attempt an I/O bus access once they have received the IOBUS_BSY- signal on the line 52 at an active level. Additionally, in the state S3, the control logic 130 will initiate the START- signal on a line 142. The START-signal on the line 142 is delivered to the timer 132 to begin a time-out period to determine the type of I/O transaction that has been requested. The control logic 130 then proceeds to a state S4.

In the state S4, the control logic 130 awaits the receipt of a TIMEOUT- signal on a line 144 at an active level or the receipt of the SBUSACK- signal on the line 136. The TIMEOUT- signal on the line 144 is generated by the timer 132 once a predetermined period of time has passed from the receipt of the START- signal on the line 142. The TIMEOUT-signal on the line 144 is used to determine when the current transaction is an I/O bus #1 124 to an I/O bus #2 126 type transaction, or vice versa. If the I/O transaction is an I/O bus #1 124 to I/O bus #2 126, or vice versa, type transaction, then the control logic 130 will set the IOBUS_BSY- signal on the line 52 to an inactive level thereby enabling the CPU module 12 to attempt another access to the I/O buses 124, 126, respectively. Otherwise, the control logic 130 awaits the receipt of the SBUS_ACK- signal on the line 136 to be received from the arbitration logic circuit 128 to indicate that the system bus 18 is acknowledging the request from the I/O buses 124, 126, respectively, to enable data to be transferred to a requesting device. The control logic 130 will then deassert IOBUS_BSY- signal on the line 52 enabling other CPU modules 12 to access the I/O buses 124, 126. Upon the receipt of either the TIMEOUT- signal on the line 144 at an active level or the SBUS_ACK- signal on the line 136 at an active level, the control logic circuit 130 will return to the state S0 and await another request by the system bus 18.

If the TIMEOUT- signal on the line 144 and the SBUS_ACK-signal on the line 136 remains inactive, the control logic circuit 130 remains in the state S4 and reinitiates the IOBUS_BSY- signal on the line 52 and the START- signal on the line 142 at active levels. When the control logic 130 transitions from the state S4 to the state S0, the control logic circuit sends a RESET-signal on a line 146 to an active level. The RESET-signal on the line 146 is received by the timer circuit 132 and resets the time-out clock until the next START- signal on the line 142 is received from the control logic circuit 130.

The alternate embodiment of the bus bridge circuitry 120 is different than the first embodiment of the bus bridge circuit 22 because the bus interface circuit 122 eliminates the problems associated with a simultaneous access request by an I/O controller 16 on the I/O buses 122, 124, and a CPU module 12 request. In both embodiments, the IOBUS_BSY-signal on the line 52 prevents the CPU modules 12 from initiating an I/O bus request when another CPU module 12 or one of the I/O buses 124, 126 has already requested access, as described above. Additionally, the alternate embodiment of the bus bridge circuitry 120 utilizes the IOBUS_BSY- signal on the line 52 to "back off" a CPU module 12 that requests access to the I/O bus when another CPU module 12 or one of the I/O buses 124, 126 has requested the I/O bus before the requesting CPU module 12 has received the IOBUS_BSY- signal on the line 52. When a second CPU module 12 requests access to the I/O buses 124, 126 before the IOBUS_BSY- signal on the line 52 is initiated, the SEOT-signal on the line 112 and the IOBUS_BSY- signal on the line 52 are returned at active levels. When the second requesting CPU module 12 receives these two signals at active levels, the alternate embodiment of the bus control logic 150 on the CPU module 12 recognizes that its previously requested cycle was not completed. The bus control logic 32 on the CPU module 12 will wait for the IOBUS_BSY-signal on the line 52 to return to an inactive level and at that point will reinitiate the previous address request. The communication between the alternate embodiment of the bus controller logic 150 on the CPU modules 12 and the alternate embodiment of the bus bridge 120 will be described in more detail in association with FIGS. 10A–10B below.

Figure 9:
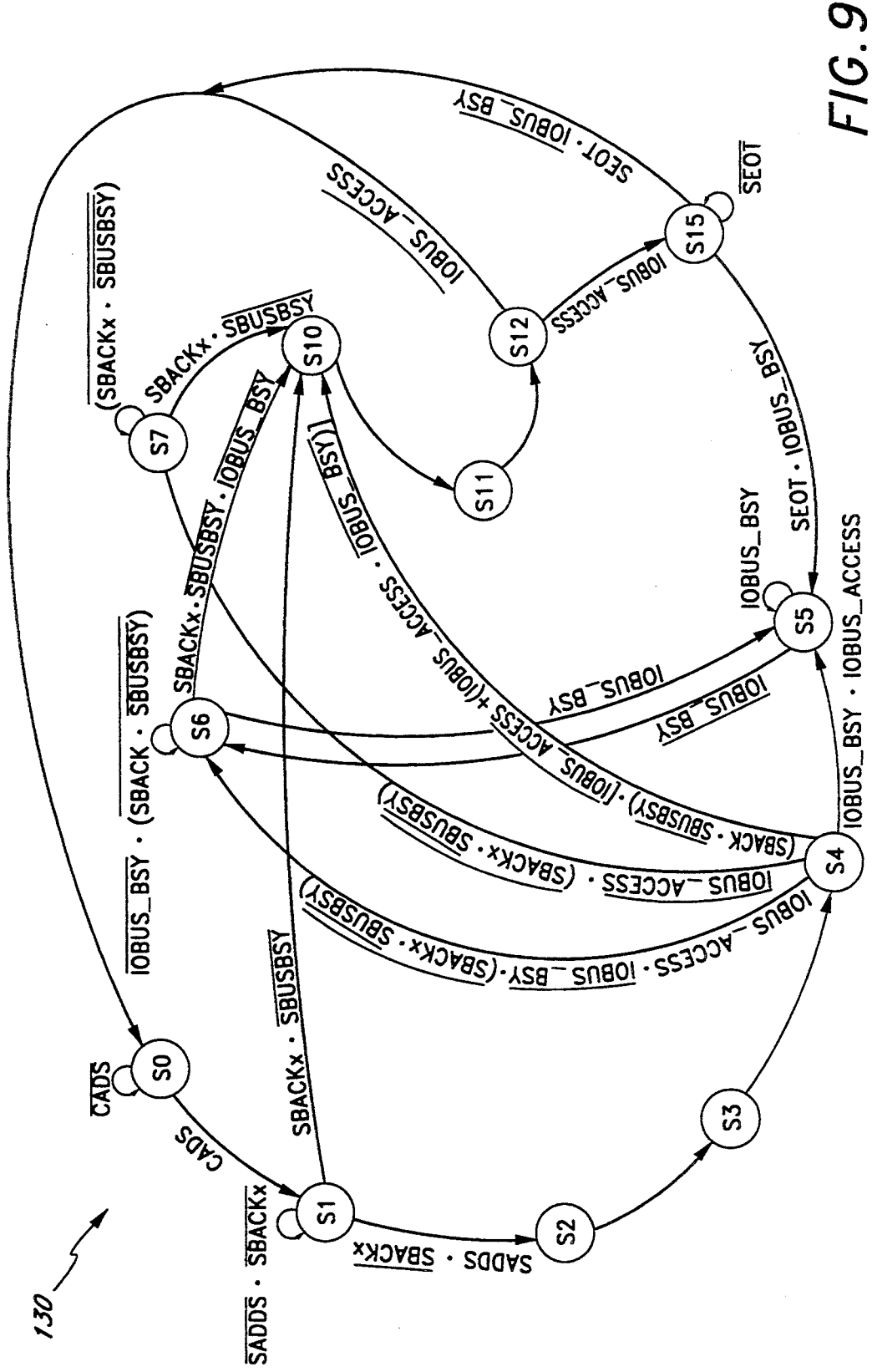
FIG. 9 is a state diagram illustrating the bus control logic of an alternate embodiment of the bus controller on each CPU module which implements the bus signaling protocol of the present invention.

FIG. 9 illustrates the state diagram for the alternate embodiment of the bus controller logic 150 on a CPU module 12. The alternate embodiment of the bus controller 150 has been modified to communicate with the signals from the alternate embodiment of the bus bridge 120. Beginning in a state S0, the bus controller 150 awaits a CPU address strobe (CADS-) signal on the line 80 to be received at an active level. While the CADS-signal remains inactive, the bus controller remains in the state S0. Once the CADS- signal on the line 80 is received at an active level, the bus controller proceeds to the state S1.

In the state S1, the bus controller monitors the state of the SADDS- signal on the line 96, the SBACKx-signal on the line 74 and the SBUSBSY- signal on the line 86. While the SADDS- signal and the SBACKx- signals remain inactive, the bus controller 150 remains in the state S1. Once an SBACKx- signal on the lines 74 becomes active and the SBUSBSY- signal on the line 86 is inactive, the bus controller 150 proceeds to a state S10. Once the SADDS-signal on the line 96 is active, and the SBACKx- signal on the line 74 remains inactive, the bus controller 150 proceeds to the state S2.

In the state S2, the CPU module 12 is ready to present a valid address request to the system bus 18 but the system bus 18 has not been granted to the requesting CPU module 12. From the state S2 the bus controller 150 transitions to a state S3 and then state. S4 over the next two clock cycles. In the state S4, the bus controller 150 monitors the state of the IOBUS_ACCESS- signal on the line 42, the IOBUS_BSY-signal on the line 52, the SBACKx- signals on the lines 74, and the SBUSBSY- signal on the line 86. If the IOBUS_ACCESS-signal on the line 42 is active, the IOBUS_BSY- signal on the line 52 is inactive, the SBACKx- signals on the lines 74 are inactive and the SBUSBSY- signal on the line 86 is active, the bus controller proceeds to a state S6. The transition of the bus controller 150 from the state S4 to the state S6 signifies that the CPU-requested address requires access to the I/O bus 20 and the I/O bus 20 is currently not busy with another transaction. Additionally, the transition from the state S4 to the state S6 signifies that the system bus 18 is currently busy with a bus transaction, and has therefore not granted the bus request of the requesting CPU module 12.

In the state S4, if the IOBUS_ACCESS signal on the line 42 is at an inactive state, the SBACKx- signals on the lines 74 are inactive, and the SBUSBSY- signal on the line 86 is active, the bus controller 150 proceeds to a state S7. The transition from the state S4 to the state S7 signifies that the CPU requested address does not require access to the I/O bus 20. Additionally, the transition from the state S4 to the state S7 indicates that the system bus 18 is currently busy with a transaction and the bus controller 150 has not been granted access to the system bus 18.

Finally, in the state S4, if the bus controller receives the IOBUS_ACCESS- signal on the line 42 at an inactive level or if the bus controller 150 receives the IOBUS_ACCESS-signal on the line 42 at an active level, along with the IOBUS_BSY- signal on the line 52 at an inactive level, and if the bus controller 150 has additionally received an SBACKx-signal on one of the lines 74 at an active level and the SBUSBSY- signal on the line 86 at an inactive level, then the bus controller 150 proceeds to the state S10. The transition from the state S4 to the state S10 signifies that the CPU requested address does not require access to the I/O bus 20, or if the address requires access to the I/O bus 20, the I/O bus 20 is not currently busy with a transaction. Additionally, the transition from the state S4 to the state S10 signifies that the system bus 18 is currently available and the bus controller 150 has been granted access to the system bus 18.

If in the state S4, the bus controller 150 receives the IOBUS_BSY- signal on the line 52 at an active level and receives the IOBUS_ACCESS signal on the line 42 at an active level, the bus controller 150 proceeds to a state S5. The transition between the state S4 and the state S5 by the bus controller 150 signifies that the CPU-requested address requires access to the I/O bus 20, and that the I/O bus 20 is currently busy with an I/O request.

In the state S5, the bus controller 150 monitors the state of the IOBUS_BSY- signal on the line 52. If the IOBUS_BSY- signal on the line 52 remains active, the bus controller 150 remains in the state S5. Once the IOBUS BSY-signal on the line 52 transitions to an inactive level, the bus controller 150 will proceed to a state S6. The transition from the state S5 to the state S6 indicates that the I/O bus 20 is no longer busy with a transaction and is available for access.

In the state S6, the bus controller 150 monitors the state of the IOBUS_BSY- signal on the line 52, the SBACKx- signals on the lines 74, and the SBUSBSY- signal on the line 86. If the IOBUS_BSY- signal on the line 52 remains inactive, the SBACKx- signals on the lines 74 are inactive, and the SBUSBSY- signal on the line 86 is active, the bus controller 150 will remain in the state S6. If the IOBUS BSY- signal on the line 52 is active, the bus controller 150 will return to the state S5 until the IOBUS_BSY- signal on the line 52 returns to an inactive level. If a SBACKx- signal on one of the lines 74 is active, the SBUSBSY- signal on the line 86 is inactive and the IOBUS_BSY- signal on the line 52 is inactive, the bus controller 150 proceeds to the state S10. The transition from the state S6 to the state S10 signifies that the system bus 18 is available for access and the system bus 18 has been granted to the requesting CPU module 12. Additionally, the transition from the state S6 to the state S10 indicates that the I/O bus 20 is available for access by the requesting CPU module 12.

In the state S7, the bus controller 150 of the requesting CPU module 12 monitors the state of its respective SBACKx- signal on the lines 74 and the SBUSBSY- signal on the line 86. If the SBACKx- signal remains inactive and the SBUSBSY- signal remains active, the bus controller logic remains in the state S7. Once the CPU module's respective SBACKx- signal on the lines 74 becomes active while the SBUSBSY- signal on the line 86 is inactive, the bus controller 150 proceeds to the state S10. The transition from the state S7 to the state S10 signifies that the system bus 18 is now available for access and the requesting CPU module 12 has been granted access to the system bus 18.

From the state S10 the bus controller 150 proceeds to a state S11 and state S12 over the next two clock cycles. In the state S12 the bus controller 150 monitors the state of the IOBUS_ACCESS- signal on the line 42. If the IOBUS_ACCESS- signal on the line 42 is inactive, indicating that the requested address does not require access to the I/O bus, the bus controller 150 returns to the state S0 and awaits the next microprocessor address request. If the IOBUS_ACCESS- signal on the line 42 is active, the bus controller proceeds to a state S15. The transition from the state S12 to the state S15 signifies that the CPU-requested address requires access to the I/O bus.

In the state S15, the bus controller 150 monitors the state of the SEOT- signal on the line 112 and the IOBUS_BSY-signal on the line 52. While the SEOT-signal on the line 112 remains inactive, the bus controller 150 remains in the state S15. If the SEOT- signal is active and the IOBUS_BSY-signal on the line 52 is active, the bus controller returns to the state S5. The transition from the state S15 to the state S5 signifies that the CPU requested access to the I/O bus was received after the I/O bus was granted to another requester, and the bus controller 150 must wait for the current I/O cycle to be completed. By returning to the state S5, once the current I/O cycle is completed, the bus controller 150 may try to access the I/O bus once again. I in the state S15, the SEOT- signal on the line 112 is active and the IOBUS_BSY- signal on the line 52 is inactive, the bus controller 150 returns to the state S0. The transition from the state S15 to the state S0 signifies that the CPU module's requested access to the I/O bus has been completed. Once in the state S0, the bus controller 150 awaits the next microprocessor 24 requested address.

Figure 10A:
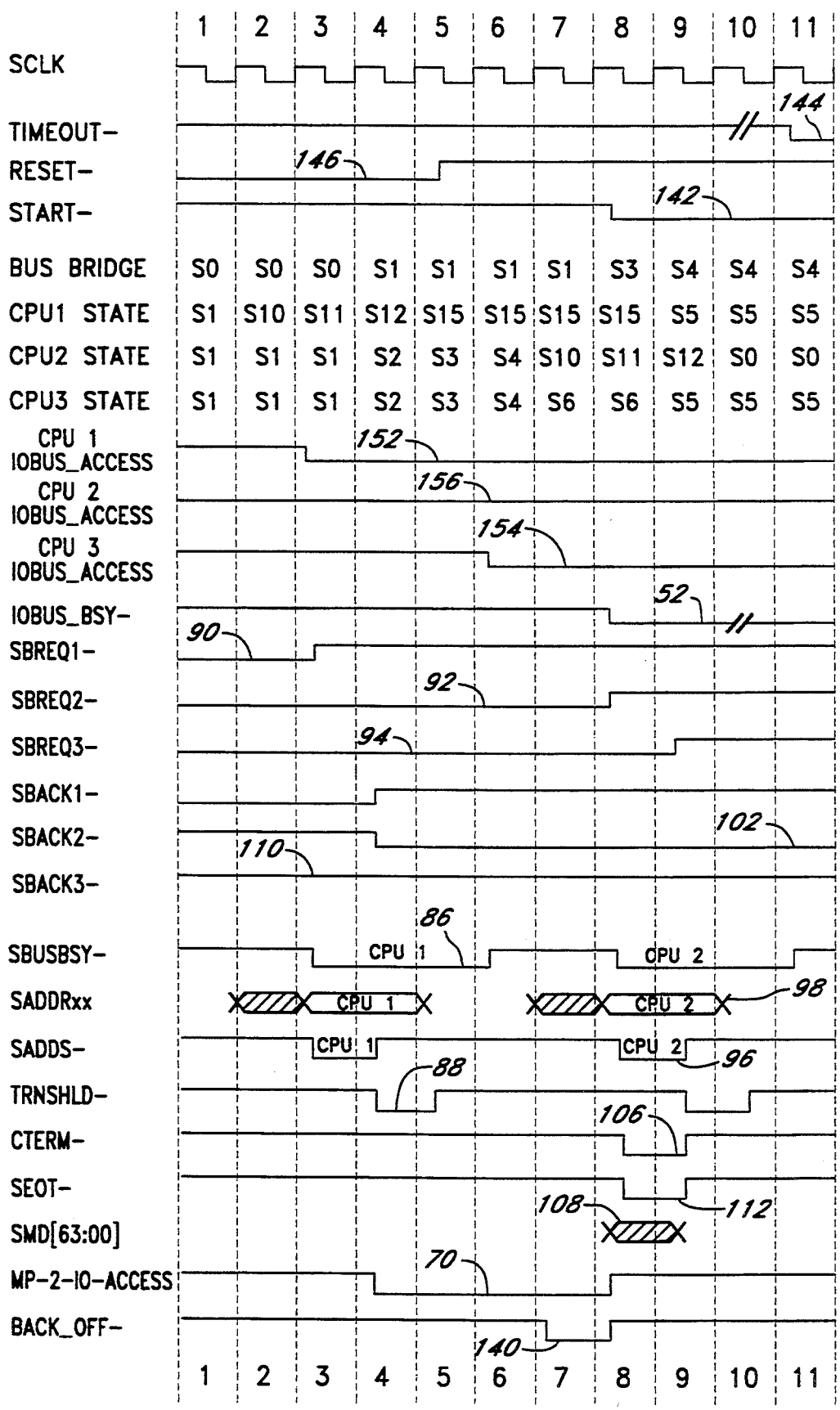
FIG. 10A is a timing diagram illustrating clock cycles 1-11 of an attempted access to the I/O bus by two of the CPU modules when the I/O bus is busy with other transactions.
Figure 10B:
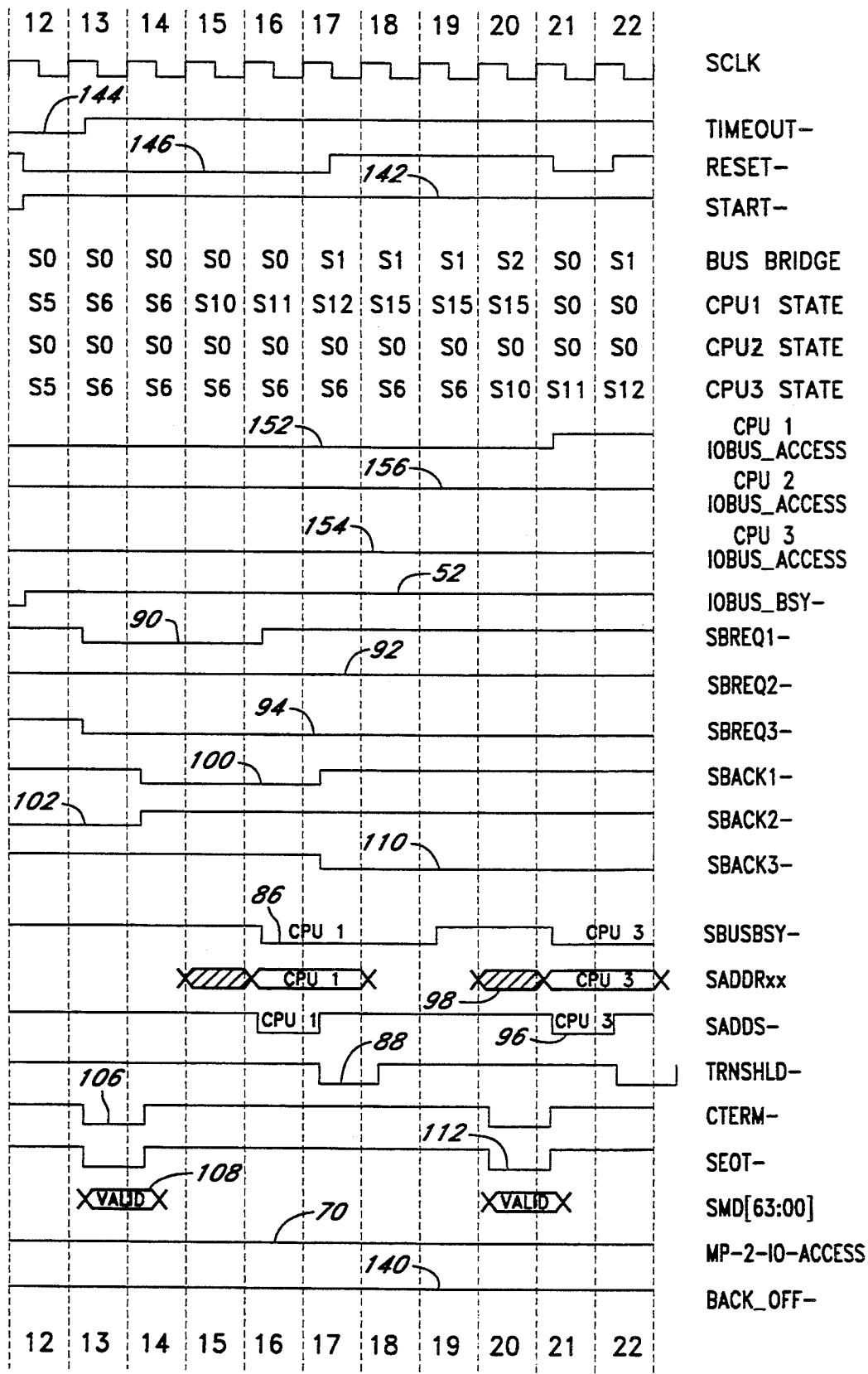
FIG. 10B is a timing diagram illustrating clock cycles 12-22 of an attempted access to the I/O bus by two of the CPU modules when the I/O bus is busy with other transactions.

The communication between the bus controller 150 and the alternate embodiment of the bus bridge 120 will be described in more detail in association with FIGS. 10A-10B. FIGS. 10A-10B illustrate a timing diagram of a variety of attempted CPU module accesses to both the system bus 18 and the I/O bus 20. The states of the bus controller CPU modules and the control logic 130 on the bus bridge 120 which correspond to the states in the diagrams of FIGS. 8 and 9 are illustrated at the top of the diagram.

Beginning at a clock cycle 1 of the timing diagram, the control logic 130 on the bus bridge 120 waits for an address request from one of the CPU modules 12. Each of the microprocessors on CPU module #1, CPU module #2, and CPU module #3 have sent an address request to their respective bus transceivers 30. Additionally, in the clock cycle 1 the SBREQ1- signal on the line 90 and the SBREQ2- signal on the line 92 and the SBREQ3- signal on the line 94 are all active. This signifies that each of the CPU modules 12 has requested access to the system bus 18.

In a clock cycle 2, the SBACK1- signal on the line 100 is active. This signifies that the system bus 18 has granted access to CPU module #1. Additionally, the SBUSBSY- signal on the line 86 is inactive, thereby indicating that the system bus 18 is available.

In a clock cycle 3, CPU module #1 places its address SADDRxx onto the lines 98 of the system bus 18 and initiates the SADDS- signal on the line 96. The address is valid from the clock cycle 3 through the clock cycle 4. With the requested address on the system bus 18, the SBUSBSY- signal on the line 86 becomes active, indicating that the system bus 18 is currently processing a transaction. Finally, CPU module #1 sets its SBREQ1- signal on the line 90 to an inactive level, indicating that CPU module #1 is no longer requesting access to the system bus 18. Additionally, CPU module #1 indicates that its requested address requires access to one of the I/O buses 124, 126 by initiating a CPU1 IOBUS_ACCESS signal on the line 152.

In the clock cycle 4, the TRNSHLD- signal on the line 88 is initiated to enable the devices on the system bus 18 to determine if they are responsive to the requested address. In response to the deassertion of the SBREQ1- signal on the line 90, the bus arbitration logic 128 deasserts the SBACK1-signal on the line 100. Because the system bus 18 is no longer granted to CPU module #1 after the release of the SBACK1- signal, the bus arbitration logic 128 acknowledges the request of the next CPU module 12. In this case, the bus arbitration logic 128 initiates the SBACK2- signal on the line 102, granting access to CPU module #2. Finally, the MP-2-IOBUS-ACCESS- signal on the line 70 is initiated, indicating that the address request of CPU module #1 requires access to one of the I/O buses 124, 126.

In a clock cycle 5, the RESET- signal on the line 146 is released and returns to an inactive level. In a clock cycle 6, the SBUSBSY- signal on the line 86 returns to an inactive level, indicating that the system bus 18 is available for access. Also, in the clock cycle 6, a CPU3 IOBUS_ACCESS signal on the line 154 indicates that the address requested by CPU module #3 requires access to one of the I/O buses 124, 126; however, CPU module #3 has not been granted access to the system bus 18.

In a clock cycle 7, the I/O buses 124, 126 generate a BACK OFF- signal on the line 140, indicating that the I/O buses 124, 126 are currently processing a previous I/O request.

In a clock cycle 8, with receipt of the BACK_OFF- signal on the line 140 at an active level, the control logic 130 will initiate the START- signal on the line 142 at an active level to the timer circuit 132. Further, the control logic 130 will set the IOBUS_BSY- signal on the line 52 to an active level while simultaneously initiating CTERM- signal on the line 106 and SEOT- signal on the line 112 to active levels, thereby indicating to the bus controller 150 that the previous I/O request from CPU module #1 was not completed. The IOBUS_BSY- signal on the line 52 will remain active until the I/O request has been completed. In addition, in the clock cycle 8, the SBREQ2- signal on the line 92 is deasserted to enable other CPU modules 12 to access the system bus 18. Also, in the clock cycle 8, the CPU module #2 presents its address SADDRxx to the system bus 18 on the address lines 98. The address remains valid from the clock cycle 8 through the clock cycle 10. Also, during the clock cycle 8, the bus controller 150 issues a SADDS- signal on the line 96 at an active level to enable the devices to clock in the address SADDRxx on the lines 98. In this case, the CPU module #2 requested address does not require access to either of the I/O buses 124, 126. Therefore, a CPU2 IOBUS_ACCESS signal on the line 156 remains inactive.

In a clock cycle 9, CPU module #3 deasserts the SBREQ3-signal on the line 94 because the CPU requested address requires access to the I/O buses 124, 126, and because the IOBUS_BSY- signal on the line 52 has become active indicating that the I/O bus 20 is busy. Initially, in the clock cycle 9, the TRNSHLD- signal on the line 88 is initiated to enable the devices on the system bus 18 to determine whether one of them is responsive to the requested address. A clock cycle 10 is interrupted with broken lines to indicate an indefinite period of time equal to or greater than one clock cycle between the clock cycle 9 and the clock cycle 11.

In the clock cycle 11, the TIMEOUT- signal on the line 144 is asserted indicating that the timer 132 has completed the time period initiated by the START- signal on the line 142. Additionally, the SBUSBSY- signal on the line 86 is deasserted indicating that the system bus 18 is available for access.

In a clock cycle 12, the START- signal on the line 142 is deasserted after the timer 132 has completed its time period. In addition, the RESET- signal on the line 146 is initiated at an active level to reset the timer 132. With the receipt of the TIMEOUT- signal on the line 144 at an inactive level before the receipt of a SBUS_ACK- signal on the line 136, the control logic circuit 130 deasserts the IOBUS_BSY- signal on the line 52 to enable another attempted I/O access. The receipt of the TIMEOUT- signal on the line 144 at an inactive level indicates that the I/O request was most likely a transfer from the I/O bus #1 124 to the I/O bus #2 126, and, therefore, the bus bridge 120 will enable another processor to attempt access.

In a clock cycle 13, the TIMEOUT- signal on the line 144 is deasserted because the time out period has ended. With the receipt of the IOBUS_BSY- signal on the line 52 at an inactive level, the CPU module #1 attempts to initiate another I/O request by asserting the SBREQ1- signal on the line 90. Additionally, CPU module #3 attempts to initiate an I/O cycle by asserting the SBREQ3- signal on the line 94. Further, in the clock cycle 13, the data requested by CPU module #2 is valid and has been presented to the data lines SMD[63:00]108 on the system bus 18. In the clock cycle 13, CPU #2 has accepted the data transfer and the CTERM- signal on the line 106 returns to an active high state. Additionally, because the requested data only requires one clock cycle to transfer, the SEOT- signal on the line 112 is strobed low indicating that this is the last data to be transferred.

In a clock cycle 14, the SBACK2- signal on the line 102 is deasserted acknowledging the deassertion of the SBREQ2-signal on the line 92. Because the system bus 18 is no longer granted to CPU module #2 after the release of the SBACK2- signal, the arbitration logic 128 acknowledges the request of the next CPU module 12. In this case, the arbitration logic initiates the SBACK1- signal on the line 100 to indicate that CPU module #1 is granted access to the system bus 18.

In a clock cycle 15, CPU module #1 begins to place an address on the SADDRxx lines 98 of the system bus 18. In a clock cycle 16, CPU module #1 strobes the SADDS- signal on the line 96 to an active level indicating that the address requested by CPU #1 is on the system bus 18 and is valid. The SADDRxx signals on the lines 98 are valid during the clock cycles 16 and 17. With the presentation of the CPU requested address on the system bus 18, the SBUSBSY- signal on the line 86 is asserted indicating that the system bus 18 is busy with a transaction. Finally, the SBREQ1- signal on the line 90 is deasserted since the system bus 18 has been granted to CPU module #1.

In the clock cycle 17, the valid CPU #1 requested address is latched in by the bus bridge 120. The bus controller logic 130 on the bus bridge 120 initiates the RESET- signal on the line 146 to reset the timer 132 to its initial position. Additionally, the SBACK1- signal on the line 100 is deasserted acknowledging the deassertion of the SBREQ1- signal on the line 90 during the previous clock cycle. Because the system bus 18 is no longer granted to CPU module #1 with the release of the SBACK1- signal, the arbitration logic 128 acknowledges the request of the next CPU module 12. In this case, the arbitration logic 128 initiates the SBACK3- signal on the line 110 granting the system bus 18 to CPU module #3. Finally, the TRNSHLD- signal on the line 88 is initiated to enable the devices on the system bus 18 to determine if one of the devices is responsive to the requested address.

In a clock cycle 19, the SBUSBSY- signal on the line 86 is released by CPU #1 because the requested address has already been latched by the bus bridge 120 and because the system bus 18 is no longer required by CPU module #1.

In a clock cycle 20, CPU #3 prepares to place its address onto the system bus 18. Additionally, the data requested by CPU #1 from one of the I/O buses 124, 126 is available. The valid data is presented to the data lines SMD[63:00] 108 of the system bus 18. Further, the control logic 130 initiates the cycle terminate (CTERM-) signal on the line 106 to indicate that the requested data is available. Valid data is received by CPU #1 on the system bus 18 at the leading edge of the clock cycle 21. Further, since the requested data requires only one clock cycle to transfer, the SEOT- signal on the line 112 is strobed for one clock cycle to indicate that this will be the last data transmitted by the bus bridge 120 at this time.

In the clock cycle 21, the RESET- signal on the line 146 is asserted to an active level to reset the timer 132 to a new time period to monitor the next I/O transfer. In addition, the IOBUS_ACCESS- signal on the line 42 for CPU #1 is deasserted as the I/O request for CPU #1 has been completed. Further, CPU #3 places its valid address SADDRxx signals on the lines 98 of the system bus 18. The requested address is valid during the clock cycles 21 and 22. The SADDS- signal on the line 96 is strobed low for one clock cycle to enable the devices on the system bus 18 to latch the address request. With the placement of the address request of CPU module #3 onto the system bus, the SBUSBSY- signal on the line 86 is initiated at an active level to indicate that the system bus 18 is busy with the next transaction.

In a clock cycle 22, the TRNSHLD- signal on the line 88 is initiated to enable the devices on the system bus 18 to determine if one of the devices is responsive to the requested address. The remainder of the I/O cycle is completed in the manner described above in association with CPU module #1.

As described above, the generation of the IOBUS_BSY-signal 52 by the bus bridge 22 indicates to all of the CPU modules 12 that the I/O bus 20 has been requested, and the CPU modules 12 will have to hold their I/O request until the current transaction is completed. By preventing the other CPU modules 12 from executing an I/O request, the system bus 18 does not have to be held idle. During this previously held time, the system bus 18 can be used for memory-to-CPU Module transactions and CPU Module-to-CPU Module transactions, such as cache hit responses, while the I/O bus 20 is in use. By reducing the amount of time that the system bus must be held idle, the overall system bus performance is greatly increased.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes that come within the meaning and range of equivalency of the claims are to be embraced within their scope.

What is claimed is:

1. An improved signaling protocol circuit for use in a multiprocessor system, said multiprocessor system comprising a plurality of CPU modules connected to a common system bus and connected to an I/O bus via an I/O bus bridge, said signaling protocol circuit comprising:
   an I/O bus protocol circuit on said I/O bus bridge which generates an I/O bus busy signal having first and second logic states, said first logic state indicating that said I/O bus is currently busy processing an I/O bus transaction, said second logic state indicating that said I/O bus is available to process an I/O bus transaction;
   a bus controller logic circuit on each of said CPU modules, each said bus controller logic circuit receiving an address request from a respective CPU and controlling the delivery of said CPU address request to said system bus; and
   an I/O bus inhibit circuit on each of said CPU modules, said I/O bus inhibit circuit further comprising:
      an address and cycle type decoder which generates an I/O bus access signal having first and second logic states, said first logic state indicating said CPU address request requires access to said I/O bus, said second logic state indicating said CPU address request does not require access to said I/O bus;
      a logic circuit having first and second inputs, a first input of said logic circuit connected to said I/O bus access signal and said second input of said logic circuit connected to said I/O bus busy signal, an output of said logic circuit generating an inhibit signal, wherein said inhibit signal is connected to said bus controller logic circuit to inhibit the delivery of said CPU address request to said system bus until said I/O bus has completed a current I/O transaction.

2. The improved signaling protocol circuit as described in claim 1, further comprising a buffer circuit interposed between said system bus and said I/O bus, wherein data transferred from said system bus to said I/O bus is transferred into said buffer circuit at a system bus rate and is transferred out of said buffer circuit at an I/O bus rate and data transferred from said I/O bus to said system bus is transferred into said buffer circuit at an I/O bus rate and is transferred out of said buffer circuit at a system bus rate.

3. An improved signaling protocol method for use in a multiprocessor system, said multiprocessor system comprising a plurality of CPU modules connected to a common system bus and connected to an I/O bus via an I/O bus bridge, said signaling protocol method comprising the steps of:

generating an I/O bus busy signal, having first and second logic states, on said I/O bus bridge, said first logic state indicating that said I/O bus is currently busy processing an I/O bus transaction, said second logic state indicating that said I/O bus is available to process an I/O bus transaction;

receiving said I/O bus busy signal at each of said CPU modules;

determining if a CPU address request requires access to said I/O bus;

processing said CPU address request on said common system bus when said common system bus is available if said CPU requested address does not require access to said I/O bus irrespective of the state of said I/O bus busy signal;

holding said CPU address request if said address request requires access to said I/O bus and said I/O bus busy signal is at said first logic state; and processing said CPU address request when said system bus is available if said address request requires access to said I/O bus and said I/O bus busy signal is at said second logic state.

* * * * *